(12) United States Patent
Lopatin

(10) Patent No.: US 11,762,183 B2
(45) Date of Patent: Sep. 19, 2023

(54) METHOD AND APPARATUS FOR GENERATING REFLECTIVE DARK FIELD (RDF) ILLUMINATION FOR A MICROSCOPE

(71) Applicant: WDI Wise Device Inc., Richmond Hll (CA)

(72) Inventor: Alex Lopatin, Richmond Hill (CA)

(73) Assignee: WDI Wise Device Inc., Richmond Hill (CA)

( * ) Notice: Subject to any disclaimer, the term of this patent is extended or adjusted under 35 U.S.C. 154(b) by 85 days.

(21) Appl. No.: 17/218,878

(22) Filed: Mar. 31, 2021

(65) Prior Publication Data

US 2021/0302711 A1    Sep. 30, 2021

Related U.S. Application Data

(60) Provisional application No. 63/002,439, filed on Mar. 31, 2020.

(51) Int. Cl.
*G02B 21/12*    (2006.01)

(52) U.S. Cl.
CPC .................................. *G02B 21/125* (2013.01)

(58) Field of Classification Search
CPC .. G02B 21/125; G02B 21/00; G02B 21/0004; G02B 21/002; G02B 21/0032; G02B 21/06; G02B 21/08; G02B 21/082; G02B 21/218084; G02B 21/10; G02B 21/12; G02B 21/14; G02B 21/36; G02B 21/361
USPC ....... 359/385, 362, 363, 368, 369, 387, 388, 359/389, 390
See application file for complete search history.

(56) References Cited

U.S. PATENT DOCUMENTS

| | | | |
|---|---|---|---|
| 7,226,185 B2 * | 6/2007 | Dolgin | G02B 7/023 362/455 |
| 2016/0216500 A1 * | 7/2016 | Arashi | G02B 21/248 |

* cited by examiner

*Primary Examiner* — Arnel C Lavarias
(74) *Attorney, Agent, or Firm* — Gowling WLG (Canada) LLP

(57) ABSTRACT

A system and method for generating reflective dark field illumination in an imaging system that includes a set of elementary illuminators, each of the set of elementary illuminators including a light source, a lens assembly and an illuminator aperture; and a bright field/dark field (BD) lens. The set of elementary illuminators are positioned in a ring-like shape to direct light towards a port of the BD lens. Depending on an application of the imaging system, a lens assembly focal distance and a distance between a light source and a lens assembly are determined based on the application.

15 Claims, 14 Drawing Sheets

METHOD AND APPARATUS FOR GENERATING REFLECTIVE DARK FIELD (RDF) ILLUMINATION FOR A MICROSCOPE

CROSS-REFERENCE TO OTHER APPLICATIONS

The disclosure claims priority from U.S. Provisional Application No. 63/002,439 filed Mar. 31, 2020, the contents of which are hereby incorporated by reference.

FIELD OF THE DISCLOSURE

The present disclosure relates generally to imaging systems. More particularly, the present disclosure relates to a method and apparatus for generating Reflective Dark Field (RDF) illumination for a microscope.

BACKGROUND OF THE DISCLOSURE

One way of improving contrast in an imaging system, such as a reflected light microscope, is to use dark field illumination. An efficient Reflective Dark Field (RDF) illuminator generally creates a uniformly distributed high intensity light flux in the field of view (FOV) of the microscope and a low RDF image background. For current systems, the RDF illuminator is typically installed above the placement of the sample. In some current systems, the RDF illumination is provided by a set of continuous and circularly (elliptically) distributed real or virtual light sources. In order to switch between RDF illumination and other microscope modalities, there may be a need to displace certain microscope components. Modalities include, but are not limited to, a bright field modality, a dark field modality, a phase contrast modality, a polarization contrast modality and a fluorescence/luminescence modality.

Different RDF illuminators are currently available in the art with two shown in FIGS. 1a and 1b. In the prior art RDF illuminator of FIG. 1a, the illuminator 100a, which is typically located within a microscope, includes a single light source 101, such as, for example, a halogen bulb. Light from the light source 101 is projected onto, and through, a diffuser 102 towards an imaging lens 103 that creates an image of the illuminated diffuser surface at a back focal plane 104 of a bright field/dark field (BD) objective lens 105 of the microscope.

In this embodiment, the illuminator 100a includes a plate that has two apertures seen as a circular aperture 106 and a "spider" aperture 107. The apertures 106 or 107 can be mechanically inserted into the illuminator optical path, behind the imaging lens 103, when needed, or desired. When the "spider" aperture 107 is inserted into the optical path, the illuminator 100a generates ring illumination for reflective dark field (RDF) modality or operation that covers the RDF port 114 entry of the BD lens 105.

A ring condenser or ring mirror 108 redirects and concentrates this light, or ring illumination, towards the microscope FOV 109 in the object plane 110. In this prior art illuminator 100a, the ring condensers and ring mirrors are designed to convert the diffuser image, created at the RDF port entry, into an illuminated spot in the microscope FOV 109. This approach allows the user to use a single light source for Reflective Bright Field (RBF) and RDF modalities. However, this approach is extremely energy inefficient for RDF modality or operation.

A second prior art illuminator is shown in FIG. 1b. In the embodiment of FIG. 1b, to increase the RDF illumination intensity, a dedicated RDF illumination light source is used. The illuminator 100b includes a light source 111, such as an optical fiber light source, that provides a collimated light beam. The collimated light beam passes through a "spider" aperture 112 towards the BD lens of the RDF port 114. In this prior art embodiment, ring condensers and/or ring mirrors 113 are designed for infinite conjugates to generate or create a fiber end image in the microscope FOV 109. Despite improved light intensity, this embodiment still includes some disadvantages whereby the "spider" aperture 112 may block up to 70% of the RDF illuminator light.

A further embodiment of a prior art illuminator is shown in FIG. 2. In this embodiment, which is disclosed in US Patent Application No. 2014/0126049, filed on Oct. 28, 2013, entitled Microscope and Darkfield Objective, the microscope includes a plurality of light emitting diodes (LED). As such, since the light source provides a light beam in the shape of a ring, there is no need for a "spider" aperture. The ring of LEDs is mounted above a BD lens of the RDF port of the microscope. A disadvantage of this system is that the light emitted by these LEDs is diverging whereby most of the emitted light will be scattered/absorbed by the BD lens RDF port walls and/or concentrated outside microscope FOV. Another disadvantage of this system is that a portion of the scattered light, being reflected/scattered by specimen and surrounding objects, may reach the microscope camera and/or observer eye and increase the RDF image background.

Therefore, there is provided a novel method and system for generating RDF illumination for a microscope.

SUMMARY OF THE DISCLOSURE

The disclosure is directed at a method and apparatus for generating Reflective Dark Field (RDF) illumination for an imaging system. In one embodiment, the disclosure is directed at a system that provides at least one of high light flux inside an imaging system, such as a microscope, field of view, uniform illumination and/or low RDF image background.

One advantage of the current disclosure is that, in some embodiments, RDF modality, or operation may be engaged simultaneously with other microscope modalities or modes or operation.

It is an aspect of the present disclosure to provide an optical microscope RDF illuminator that overcomes or mitigates at least one or more disadvantages of known apparatus. In one embodiment, the system and method of the disclosure may use off-the-shelf BD lenses design features and parameters as outlined below. However, in other embodiments of the disclosure, the system and method may be integrated within existing custom-made BD lenses and/or implemented within future BD lenses.

In one aspect of the disclosure, there is provided an apparatus for reflective dark field illumination in an imaging system including a set of elementary illuminators, each of the set of elementary illuminators including a light source, a lens assembly and an illuminator aperture; and a bright field/dark field (BD) lens; wherein the set of elementary illuminators are positioned in a ring-like shape to direct light towards a port of the BD lens; and wherein a lens assembly focal distance and a distance between a light source and a lens assembly are determined based on an application of the imaging system.

In another aspect, each of the set of elementary illuminators further includes a light source aperture located between the light source and the lens assembly for directing light from the light source towards the lens assembly. In yet another aspect, each of the set of elementary illuminators further includes a retardation plate. In a further aspect, the system includes a ring mirror or ring condenser located within the BD lens to directed received light towards an optical plane. In another aspect, the system includes a spatial filter mounted to the BD lens.

In yet another aspect, the distance between a light source and a lens assembly is calculated based on largest comparative lens assembly focal distance, calculated for every BD objective lens, attached to the imaging system. In yet a further aspect, the lens assembly focal distance and a distance between a light source and a lens assembly are selected using a thin lens approximation. In another aspect, the lens assembly includes a single, multiple or compound lens. In an aspect, the light source is a light emitting diode (LED), a superluminescent diode (SLEDs) or a laser diode (LD). In another aspect, the light source is aligned with an optical axis of the lens assembly in each of the set of elementary illuminators. In yet another aspect, the light source is shifted with respect to an optical axis of the lens assembly in each of the set of elementary illuminators. In yet a further aspect, a number of elementary illuminators in the set of elementary illuminators is a multiple of three.

In another aspect, the system further incudes a set of beamsplitters for improving RDF channel light throughput. In yet another aspect, the system further includes a set of filters for improving RDF channel light throughput.

In another aspect of the disclosure, there is provided a method of generating reflective dark field illumination in a microscope including placing a set of elementary illuminators in a ring-like shape, each of the set of elementary illuminators including a light source, a lens assembly and an illuminator apertures; and directing light from each of the set of elementary illuminators at a RDF port of a bright field/dark field (BD) objective lens; wherein a distance between the light source and the lens assembly in each of the set of element illuminators is determined based on an application of the microscope; and wherein a focal distance of the lens assembly within each of the set of elementary illuminators is determined based on the application of the microscope.

In yet another aspect, the method includes spatially filtering the light from each of the set of elementary illuminators.

DESCRIPTION OF THE DRAWINGS

Embodiments of the present disclosure will now be described, by way of example only, with reference to the attached Figures.

DETAILED DESCRIPTION

The disclosure is directed at a system and method for generating reflective dark field (RDF) illumination for a microscope. In one embodiment, the system of the disclosure includes a set of elementary illuminators that are positioned with respect to each other in a ring, or circular, shape to generate RDF illumination. In one embodiment, an elementary illuminator includes a light source, a lens assembly and an illuminator aperture.

In order to facilitate understanding of the disclosure, a list of parameters is defined below. These parameters generally relate to parameters that affect RDF illuminator performance.

$\alpha$—divergence angle for imaging system built-in RDF illumination.

$L_i$—Bright field/Dark Field (BD) lens dark field port length, where port length is measured from port entry to a ring condenser/mirror principal plane, where i represents an index for a BD lens model used with the microscope.

$C_i$—circle diameter, passing through a centre of the BD lens DF port, where i represents an index for a BD lens model used with the microscope.

$T_i$—BD lens DF port ring thickness (which may be seen as the difference between the inside and outside diameters of the port), where i represents an index for a BD lens model used with the microscope.

$EFL_i$—effective focal length of a BD lens ring condenser/mirror in paraxial approximation, where i represents an index for a BD lens model used with the microscope.

Figure 1A:
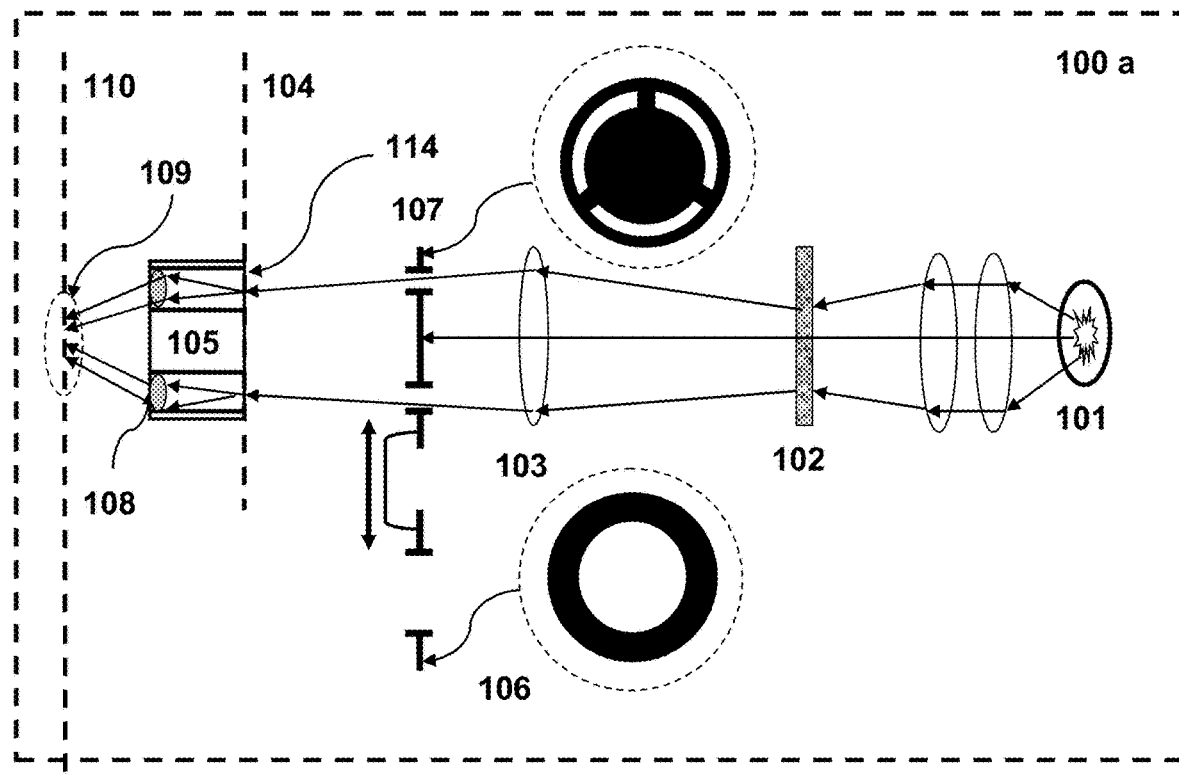
FIG. 1a is a schematic diagram of a prior art illuminator for a microscope.
Figure 1B:
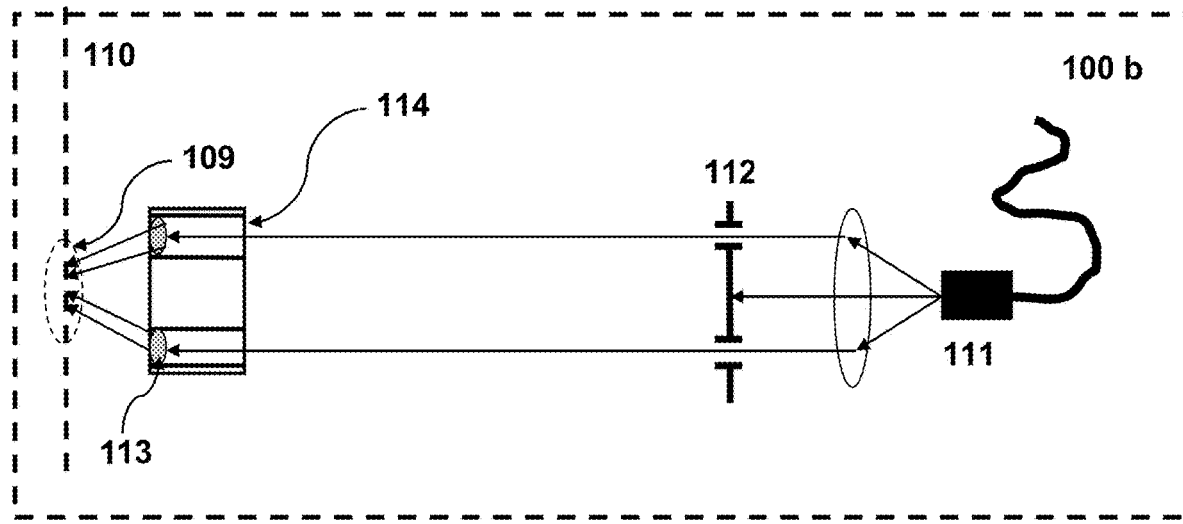
FIG. 1b is a schematic diagram of another embodiment of a prior art illuminator for a microscope.
Figure 2:
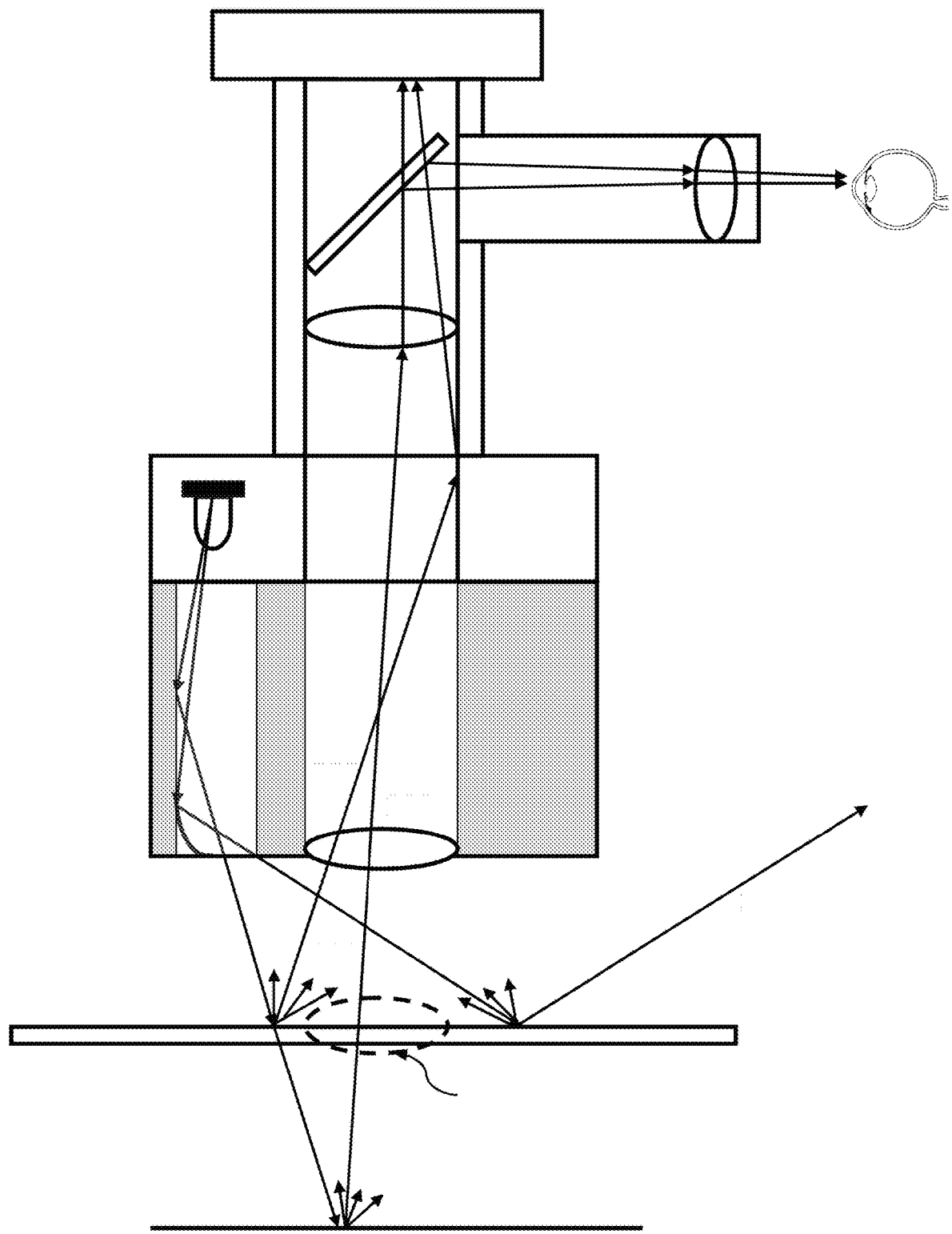
FIG. 2 is a schematic diagram of a further embodiment of a prior art illuminator for a microscope.
Figure 3:
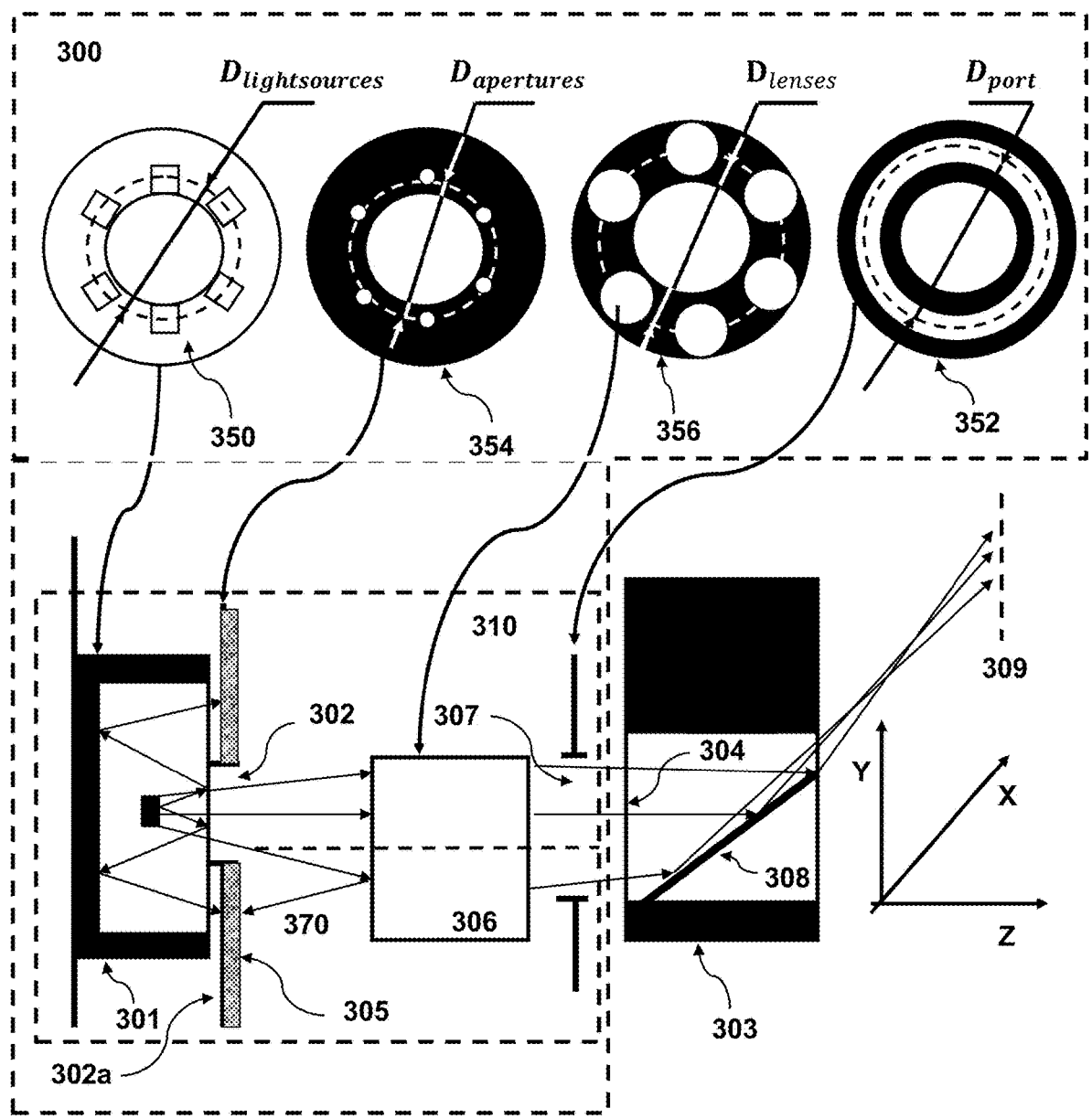
FIG. 3 is a schematic diagram of an embodiment of a reflective dark field (RDF) illuminator in accordance with an embodiment of the current disclosure.

Turning to FIG. 3, a schematic diagram of an RDF illuminator in accordance with the disclosure is provided. The RDF illuminator 300, which is typically installed within a microscope, includes a plurality of elementary illuminators that are, in the current embodiment, positioned in a circle or ring shape. In one embodiment, each elementary illuminator 310 includes a light source, a lens assembly and an illuminator aperture. The apparatus may include a controller, such as a central processing unit (CPU) and the like, to control components of the RDF illuminator.

In the current embodiment, the light source 301 of each of the elementary illuminators is positioned in a circle or ring shape having a light sources circle diameter ($D_{lightsources}$). Although individually shown in the Figure for clarity and explanation purposes, it is understood that each light source is associated with, or housed with, a lens assembly to form an elementary illuminator. In one embodiment, the emitter centers of each light source are equidistantly spaced apart around the ring or circle. An example 350 of how the plurality of light sources 301 may be positioned is shown in FIG. 3. The light sources may include, but are not limited to, light emitting diodes (LEDs), superluminescent diodes (SLEDs), laser diodes (LD) and the like.

Depending on the application, mode of operation or modality, for which the imaging system, or microscope, is being used and/or desired characteristics of the imaging system, the light source diameter may be smaller, larger or equal to $C_i$. For example, in the embodiments of FIGS. 4 to 6 and 10, the light sources circle diameter ($D_{lightsources}$) is equal to $C_i$ but for the embodiment shown in FIG. 8, the light sources circle diameter ($D_{lightsources}$) may be larger or smaller than $C_i$ to improve the RDF light intensity distribution in the object plane. This will be described in more detail below. If the microscope includes a plurality of BD objective lenses with different $C_i$ measurements, a preferred or optimal value $C_{opt}$ or $D_{port}$ may be determined or selected such as schematically shown in 352 of FIG. 3. In this case the light sources circle diameter may be smaller, larger or equal to $C_{opt}$.

In one embodiment, the value $C_{opt}$ may be calculated using equation (1):

$$C_{opt} = \frac{DO_{i,max} + DI_{i,min}}{2} \quad (1)$$

where $DO_{i,max}$ represents the largest RDF port outer diameter for all BD objective lenses being used for the microscope application; and $DI_{i,min}$ represents the smallest RDF port inner diameter for all BD lenses used for the microscope application.

The illuminator 300 may further include a set of light source apertures 302 that is located within a plate 302a. In some embodiments, one of the set of light source apertures 302 may be part of each elementary illuminator. In the current embodiment, the plate 302a is ring shaped and the apertures form a circle within the plate 302a. An example 354 of the ring plate is shown in FIG. 3. In one embodiment, the plate 302a may be manufactured from thin foil or thin sheet metal to reduce light source losses. The shape and orientation of the apertures 302 may be selected or determined based on a size and shape of the emitters of the light sources 301 and their emission angular diagrams.

In the current embodiment, the plurality of light source apertures 302 are positioned with their centers in a circle with light source apertures diameter ($D_{apertures}$) such that the centres of the light source apertures 302 are aligned with the centres of the emitters of the light sources 301. The apertures 302 reduce the amount of light that is scattered as light is directed from the light sources 301 towards an RDF port 304 of a BD lens 303. The aperture openings 302 allow light from the light sources to predominantly pass towards RDF port 304 through a set of illuminator lens assemblies 306. As schematically shown in FIG. 3, each of the lens assemblies 306 from the individual elementary illuminators are also positioned in a ring or circle with a lens assemblies diameter ($D_{lenses}$) with each of the lens assemblies associated with one of the light sources 301 and one of the light source apertures 302 to form an elementary illuminator. In some embodiments, if different BD objectives are used, $D_{lenses}$ may equal $C_{opt}$.

In an embodiment, the light source apertures 302 are placed as close to the light sources 301 as possible to reduce the amount of light that is scattered from the light sources 301 towards BD lens RDF port 304. In one embodiment, a surface 305 of the plate 302a (facing away from the light sources 301) may have a light absorbing matter deposited on it. The light absorbing matter may absorb the light that is reflected back (such as schematically shown with arrow 370) by the illuminator lens assemblies 306 as the light from the light sources passes through the lens assemblies 306 towards the port 304.

Within the BD lens 303, there is a condenser ring or mirror 308 that directs light received from the light sources by the BD lens 303 towards an object plane 309.

In operation, the lights sources 301 transmit light towards the BD lens 303 through the light source apertures 302 and the lens assemblies 306. The lens assemblies may include single or multiple lenses. LED compound lenses may also be used as a part of the lens assembly design. Spherical and aspherical singlets, achromatic doublets may also be used for the lens assembly 306 design and manufacturing.

As light passes through the apertures 302, the light is directed at the plurality of lens assemblies 306. In an embodiment, the number of lens assemblies 306 is equal to the number of light sources 301, although other lens assembly to light source ratios are contemplated.

In one embodiment, the optical center of each lens assembly is preferably positioned on a circle with diameter $C_i$ such as schematically shown in 356 of FIG. 3. If several BD objective lenses with different $C_i$ are used with the microscope, an optimal value $C_{opt}$ is selected. In this case the optical centers of the lens assemblies are positioned on circle with diameter $C_{opt}$.

In one embodiment, lens assemblies 306 are positioned with respect to the light sources 301 such that they create converging beams of light. These converging beams of light propagate through the BD lens RDF port 304 such that they, in some embodiments, barely touch the port walls or do not touch them at all so that the amount of scattered light emerging from the RDF port is reduced.

In one embodiment, as schematically shown at 356 of FIG. 3, the optical centres of the lens assemblies are equidistantly spaced in a circular pattern with diameter ($D_{lenses}$) that equals $C_i$ or $C_{opt}$ depending on the microscope application. In general, corresponding lens assemblies optical centers and light source emitter centers may be seen as belonging to the same tangential plane, but may be shifted in a Y direction relative to each other.

In an embodiment, the number of light source/lens assemblies pairs may be selected based on different considerations. These considerations may include, but are not limited to, the RDF illuminator providing illumination to arbitrary shaped objects from different directions and/or the lens assembly 306 providing a clear aperture such that relative partial light flux would be within its super-linear growth part of characteristics.

Although, any number of light source/lens assemblies pairs can be used or any number of elementary illuminators may be used, in some embodiments, the number of light sources/lens assemblies pairs (or elementary illuminators) are a multiple of three (3). For example, if known off-the-shelf BD objective lenses are used, a preference of a multiple of three arises from the fact that off-the-shelf BD lenses have three bridges inside their RDF ports that are used to link an external lens barrel with an internal lens barrel. To provide RDF illumination to arbitrary shaped objects from different directions, the number of bridges is always three since they are generally positioned under angles of 120° with respect to each other. As such, these bridges are obstacles to light propagating through the RDF port whereby if the number of light sources/lens assemblies pairs is a multiple of 3, it is possible to orient the positions of the light sources (or elementary illuminators) in the RDF illuminator with respect to the bridges such the light obstruction will be minimal, reduced or eliminated.

In one specific embodiment, discrete ring light illumination with at least fifteen light sources or more (preferably having an angular separation 18° to 24° or less) may be used.

In another embodiment, for example, for a Lambertian light source, the lens assembly numerical aperture should be less than 0.4. Decreasing the assembly clear aperture below this requirement may increase the number of light sources/lens assemblies pairs required which, in turn, may increase the RDF illuminator manufacturing complexity and cost. Increasing the assembly clear aperture above this requirement will decrease the light flux density in the microscope FOV which may also reduce a number of light sources/lens assemblies pairs to numbers below an acceptable for continuous ring light emulation.

Turning back to FIG. 3, converging light from each of the lens assemblies 306 passes through an illuminator ring aperture 307 before the converging light reaches ring condenser or ring mirror 308. Ring aperture 307 reduces or prevents significant amount of unwanted light from coming into the BD lens RDF port 304.

The converging beams of light pass through the illuminator ring aperture 307 preferably having a center line, coinciding with a diameter of the lens assembly or $D_{port}$ which may also be seen as $C_i$. If several objective lenses with different $C_i$ are used with the microscope, an optimal value $C_{opt}$ is selected as discussed above. In this embodiment, the illuminator aperture preferably has its center line coinciding with diameter $C_{opt}$.

In one embodiment, if the ring aperture 307 thickness is smaller than the BD lens RDF port ring thickness $T_i$ and if several objective lenses with different $T_i$ are used with the microscope, a preferred or optimal value $T_{opt}$ is selected. In this case the ring aperture thickness is preferably selected to be smaller than BD lens RDF port ring thickness $T_{opt}$. The RDF port ring thickness $T_{opt}$ may be calculated according to equation (2).

$$T_{opt} = \frac{DO_{i,max} + DI_{i,min}}{2} \quad (2)$$

where $DO_{i,max}$ represents the largest RDF port outer diameter for all BD lenses used for the microscope application;

$DI_{i,min}$ represents the smallest RDF port inner diameter for all BD lenses used for the microscope application.

Once the converging light contacts the ring mirror 308, the converging light is focused towards the object plane 309. The light convergence angle is determined or selected such that the focused converging light further diverges towards the object plane 309 creating an illuminated spot with required sizes.

If a significant amount of unwanted reflected/scattered light coming out of RDF port exit can be tolerated, the illuminator can create collimated light, such as discussed with respect to FIG. 5 below. In this example, the illuminated spot is created exactly in the object plane 309.

In one example, one may consider RDF illuminator 300 as an assembly, including a plurality of identical elementary RDF illuminators 310 with each elementary illuminator 310 including a single light source 301, light source aperture 302, lens assembly 306 and illuminator aperture 307 whereby multiple elementary illuminations are placed in a ring-like shape such that the diameter of the rings for each of the parts is somewhat identical.

Five embodiments for elementary RDF illuminators 310, built in correspondence with the general illuminator of FIG. 3, are shown and discussed with respect to FIGS. 4 to 6, 8 and 10. Within these embodiments, for explanation purposes, LEDs are used as light sources for the embodiments of FIGS. 4 to 6 and 8 and SLEDs and LDs are used as light sources for the embodiment of FIG. 10 as the use of SLEDs and/or LDs require separate considerations for elementary illuminator or RDF illuminator design.

In one specific embodiment, an RDF illuminator 300 includes at least 15 elementary illuminators 310 with each illuminator including a light source, a lens assembly and an aperture. The elementary illuminators are preferably positioned in a ring-like shape. In operation, the light sources consume electric power, generate light energy and produce heat that requires dissipation. In one embodiment, the illuminator 300 will be able to dissipate heat energy $P_h\sim10$ W without air/water/thermoelectric cooling or massive heatsinks. While air/water/thermoelectric cooling may increase the illuminator 300 light flux, there are other impacts on microscope operation that may not be desirable. Taking into account ~20% LEDs efficiency, it is assumed that one elementary illuminator 310 will consume approximately 1 W of electric power $P_e$.

As such, based on this determination, in one embodiment, it may be beneficial to use mid-power LEDs. For general purpose applications, white LEDs may be used. For demanding applications, such as when the microscope is aimed at tiny defects/objects of interest detection, blue LEDs may be used. All currently available BD lenses are designed for the visible light range. Hence, ultraviolet (UV) or infra-red (IR) LEDs implementation for RDF illuminators 300 currently may not be considered to be optimal, however, they may still be used as light sources.

White and blue LEDs typically include a GaN structure. These structures are characterized by a working forward voltage $V_f\sim3.5$ VDC. Hence, the electric current (I) through a single LED should be of approximately 0.2-0.3A with a current density of the order of approximately 1 A/mm². Hence, required LED emitter area should be approximately $S_e\sim0.2$-0.3 mm². LEDs, available on the market, have round or rectangular (square as a particular case) emitters.

In some embodiments, surface mounted device (SMD) LEDs are used. SMD LEDs with rectangular emitters are soldered to metal-core printed circuit boards (MCPCB) with their long sides orthogonal to a radius of the ring of light sources, passing through the emitter center.

In one embodiment, LED control may be enabled via a computer controlled driver (not shown), which provides the illuminator performance in continuous and pulsed light emitting modes.

Assuming an LED emitter with a square shape, in one embodiment, the emitter side size may be $A_e$=0.4-0.55 mm.

With respect to the light source vs. lens assembly positioning, different embodiments of the disclosure address five (5) particular embodiments, although it will be understood that these are provided as examples only and that other designs are contemplated that fall within the scope of the disclosure.

Figure 14:
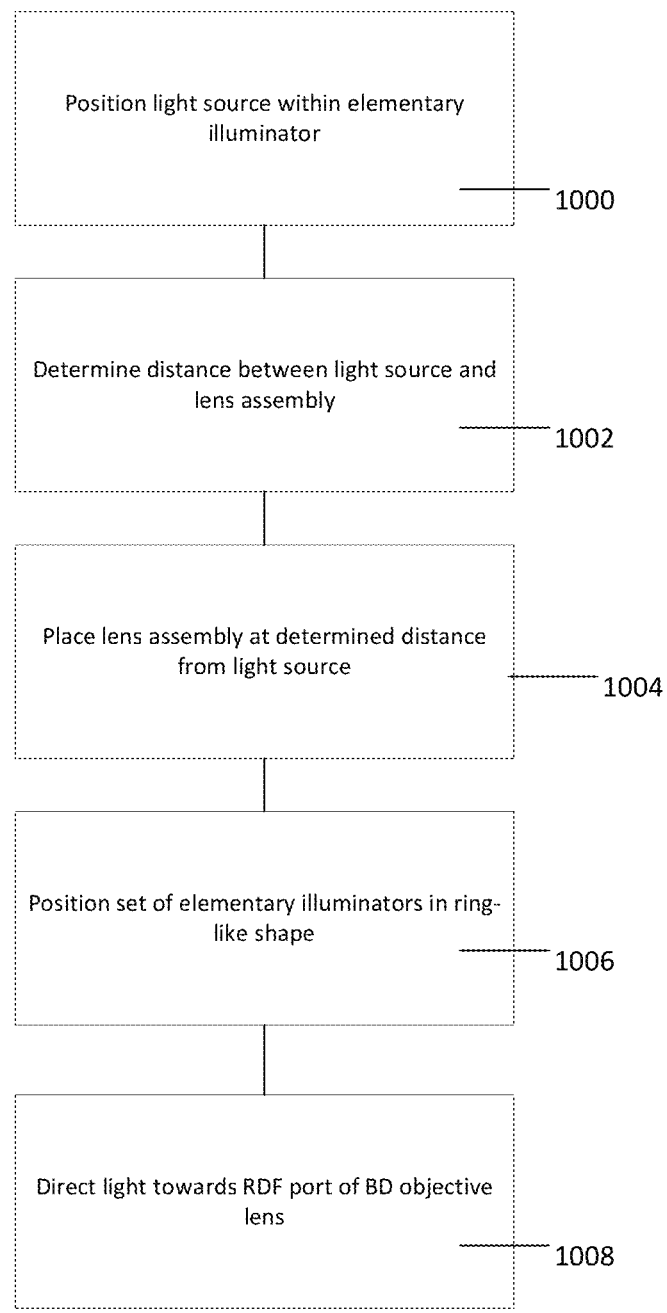
FIG. 14 is a method of generating RDF illumination.

Turning to FIG. 14, a flowchart showing a method of generating RDF illumination for a microscope is shown. Initially, a light source is positioned within an elementary illuminator housing (1000). A distance between the light source and a lens assembly is then determined (1002). The distance may be based on the application that the microscope is being used for. Depending on the application, the distance between the light source and the lens assembly and a lens assembly focal distance may be determined in (1002). In some embodiments, the lens assembly focal distance may be determined before the distance between the light source and lens assembly is determined. The lens assembly is then placed the determined distance away from the light source within the elementary illuminator (1004).

A set of elementary illuminators are then placed in a ring-like shape (1006). The light sources within the elementary illuminators are then turned on by a controller (1008) to direct light towards a RDF port of a BD objective lens.

Figure 4:
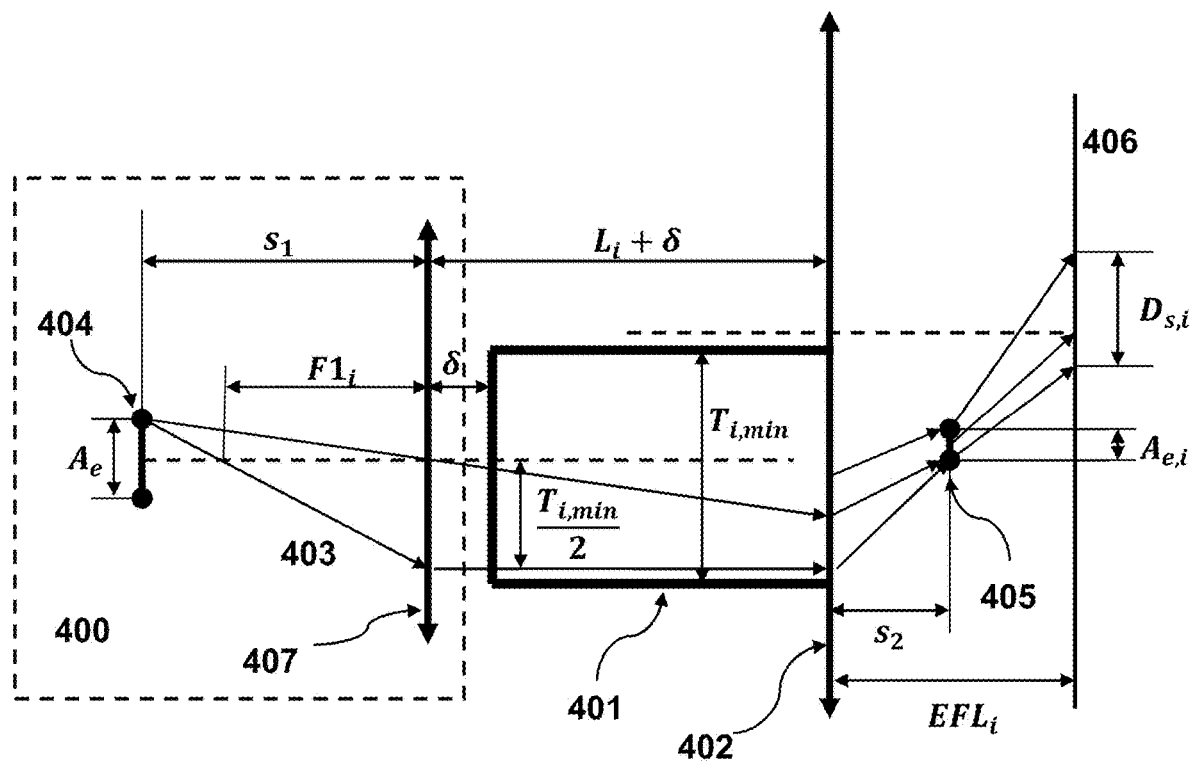
FIG. 4 is a schematic diagram of another embodiment of a RDF illuminator.

Turning to FIG. 4, another embodiment of an elementary illuminator is shown. This embodiment may be seen as one that provides a minimum or low level of scattered light, exiting the BD lens RDF port. In the following disclosure, the discussion focusses on a single elementary illuminator and the relationship between the components of the elementary illuminator.

In FIG. 4, the system includes an RDF elementary illuminator 400 for generating light that is directed towards an RDF port 401. As discussed above, for an RDF illuminator, multiple elementary illuminators are positioned in a ring shape. After passing through the RDF port 401, the light from each elementary illuminator contacts a ring condenser/mirror 402 that directs the light towards an object plane 406 thereby generating an image 405. In one embodiment, this embodiment is designed so that the light beams from the illuminators 400 do not come in contact with the walls of the BD lens RDF port 401.

In the current embodiment, each elementary illuminator 400 include a light source 404 and a lens assembly 407 that is located between light source 404 and the RDF port 401. The light from the light source passes through its associated lens assembly and then through an illuminator aperture towards the RDF port 401.

In the following discussion, the relationship between a light source and its associated lens assembly within an elementary assembly or illuminator is described, and it is understood that this relationship corresponds to each light source and lens assembly pair within each elementary illuminator 400. In another embodiment, the lens assembly 407 and ring mirror/condenser 402 may be substituted with an equivalent thin lens models. The presence of LED compound material/lens, formed above LED emitter 404, is taken into account, while deriving the lens assembly equivalent model.

To reduce the likelihood that the generated beam or beams from the light sources 404 contacts or contact the walls of RDF port 401, in one embodiment, each illuminator light source generates a converging beam with a focal ray 403 that propagates when shifted in a Y direction not more than $$\frac{T_{i,min}}{2}$$

from an optical axis or its associated lens assembly where $T_{i,min}$ represents a smallest RDF port thickness for all BD lenses depending on the application that the imaging system is being used for.

As soon as the converging beam passes through the RDF port 401, the beam is focused by ring mirror/condenser 402 above the object plane 406. In order to illuminate the required FOV area, the light beam is diverged until the FOV is covered completely.

In one embodiment, to create the required beam, a distance (seen as $S_1$) from LED emitter 404 (or light sources) to lens assembly 407 and the lens assembly focal distance (seen as $F_1$) may be selected as discussed below for the elementary illuminator design. It is assumed that LED emitter center is positioned on the optical axis of the lens assembly.

The lens assembly focal distance $F1_{max}$ is selected, or determined, as the largest value between focal distances $F1_i$ (between each of the light source and lens assembly pairs) as calculated from equation (3). Index i is related to selected BD lens parameters as outlined above.

$$A_{e,i} + \frac{(T_{i,min} - A_{e,i}) * (EFL_i - s_2)}{s_2} = D_{s,i}. \quad (3)$$

where $A_{e,i}$—LED emitter image size, calculated according to equation (4) for every i.

For a converging beam, this image is formed behind ring lens/condenser above object plane.

$$A_{e,i} = \frac{A_e \times T_{i,min} \times EFL_i}{((L_i + \delta) \times A_e - A_e \times (F1_i + EFL_i) - F1_i \times T_{i,min})} \quad (4)$$

$\delta$—distance from illuminator lens assembly to BD lens RDF port. In some embodiments $\delta$ is few millimeters.

$s_2$—distance from ring lens/condenser to LED emitter image, calculated according to equation (5).

$$s_2 = \frac{EFL_i \times ((L_i + \delta) \times A_e - F1_i \times (A_e + L_i + \delta))}{((L_i + \delta) \times A_e - F1_i \times (A_e + L_i + \delta) - EFL_i \times A_e)} \quad (5)$$

Lens assembly focal distance $F1_i$ is selected such that LED emitter image 405 is formed behind ring mirror/condenser 402 and $s_2 > 0$.

$D_{s,i}$—required illuminated spot size in the object plane 406 as calculated according to equation (6)

$$D_s, \text{mm} \geq \frac{FN}{M_o \times M_{TL}} \quad (6)$$

where FN—advertised objective lens Field Number;
$M_o$—objective magnification;
$M_{TL}$—microscope Tube Lens magnification.

Equation (3) is then solved relative to variable $F1_i$ for every BD lens used for the selected microscope application by substituting parameters $D_{s,i}$ and $\delta$ (from equations 4 and 5) into equation 3. Value $F1_{max}$ is selected as the largest of the calculated values $F1_i$. This value defines the lens assembly effective focal distance.

The distance from LED emitter to lens assembly $s_1$ is calculated according to equation (7):

$$s_1 = F1_{max} \times \left(1 + \frac{A_e}{T_{i,min}}\right) \quad (7)$$

$F1_{max}$ and $s_1$ may then be used as starting values for design of illuminator 400. At a time of optical design, a thin lens model may be substituted with real lenses/mirrors prescriptions. Optimal, or preferred, optical prescription for lens assembly 407 and its position vs. LED compartment top are calculated. It should be noted that for the current embodiment, the light propagation through illuminator is described by paraxial approximation. Optimized, or improved, lens assembly 407 with focal distance $F1_{opt}$ optical prescription and its position vs. LED compartment top defines a layout of the current embodiment of an elementary illuminator. In this embodiment, reduced light scattering on BD lens RDF port exit and low RDF image background are achieved at the expense of sub-optimal light collection efficiency from LED emitter.

Elementary illuminators, built in correspondence with the embodiment of FIG. 4 may be used effectively for BD objective lenses that do not have diffusers. If BD lenses have diffusers installed inside RDF ports, there is no need to avoid scattering of the light by the port walls as these diffusers will produce a lot of unwanted scattered light by themselves. Typically, all low magnification BD lenses have diffusers installed/created inside DF ports.

In these scenarios, when unwanted scattered light appearance may be inevitable, an elementary illuminator with improved light collection may be considered as a desirable option. This embodiment may be useful for industrial microscopy applications, employing cameras with high frame rate.

Figure 5:
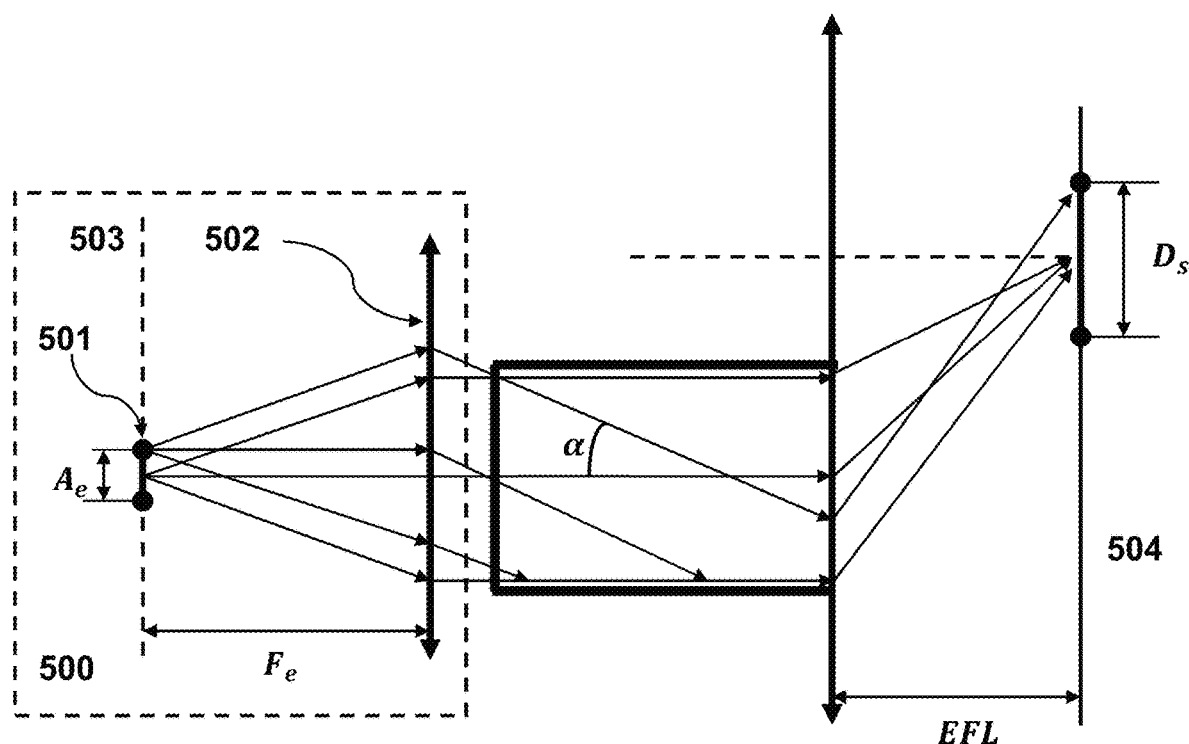
FIG. 5 is a schematic diagram of another embodiment of a RDF illuminator.

Turning to FIG. 5, another embodiment of an elementary RDF illuminator is shown. This embodiment may be seen as one that provides a high level or maximum amount of light from the illuminator light sources, or LEDs, and that is then injected into BD lens RDF port.

FIG. 5 shows an elementary illuminator 500 that includes a light source 501 and a lens assembly 502. For the RDF illuminator, the RDF illuminator includes a set of elementary illuminators that are arranged in a ring shape (such as disclosed in FIG. 3) to generate the light for the system.

In the current embodiment, elementary illuminator 500 emulates a microscope RDF light source. The elementary illuminator 500 generates collimated light beam with divergence for use with its lens assembly based on the manufacturer specifications of the lens assemblies. If the collimated light has a divergence greater than a specified, or predetermined, value, the illuminated spot diameter in an object plane 504 will be larger than specified. As such, it will spread outside a required FOV. Light, hitting the object plane 504 outside the FOV does not contribute to the RDF image intensity, but can increase the image background. If the collimated light has a divergence smaller than specified, the illuminated spot diameter in the object plane 504 will be smaller than specified. As a result, the required FOV will not be properly illuminated.

To emulate a microscope RDF light source, a lens assembly focal distance $F_e$ is selected using thin lens approximation according to equation (8). As before, the presence of LED compound material/lens, formed above LED emitter 501, is taken into account, while deriving the lens assembly 502 equivalent model.

It is assumed that the LED emitter center is positioned on lens assembly optical axis.

$$F_e = \frac{A_e}{2 \times tg(\alpha)}. \quad (8)$$

For the thin lens model, it is assumed that the LED emitter is placed into thin lens focal plane 503 for the illuminator to create collimated beams of light. The LED emitter image will be created in the BD lens object plane.

Value $F_e$ may be used as a target for optical design for illuminator 500. At a time of optical design, a lens assembly thin lens model is substituted with real lenses prescriptions. Optimal optical prescription for lens assembly 502 and its distance to the top of LED compartment is calculated with a requirement that illuminator 500 will generate collimated light beams.

Optimized lens assembly 502 optical prescription and its position vs. LED compartment top define the layout of this embodiment.

In some embodiments, it may be beneficial to find a compromise between an amount of unwanted scattered light emerging from RDF illuminator and an amount of light collected from the LEDs. This may be achieved by selecting an elementary illuminator lens assembly focal distance $F_s$ from the range $[F_e; F1_{opt}]$.

Figure 6:
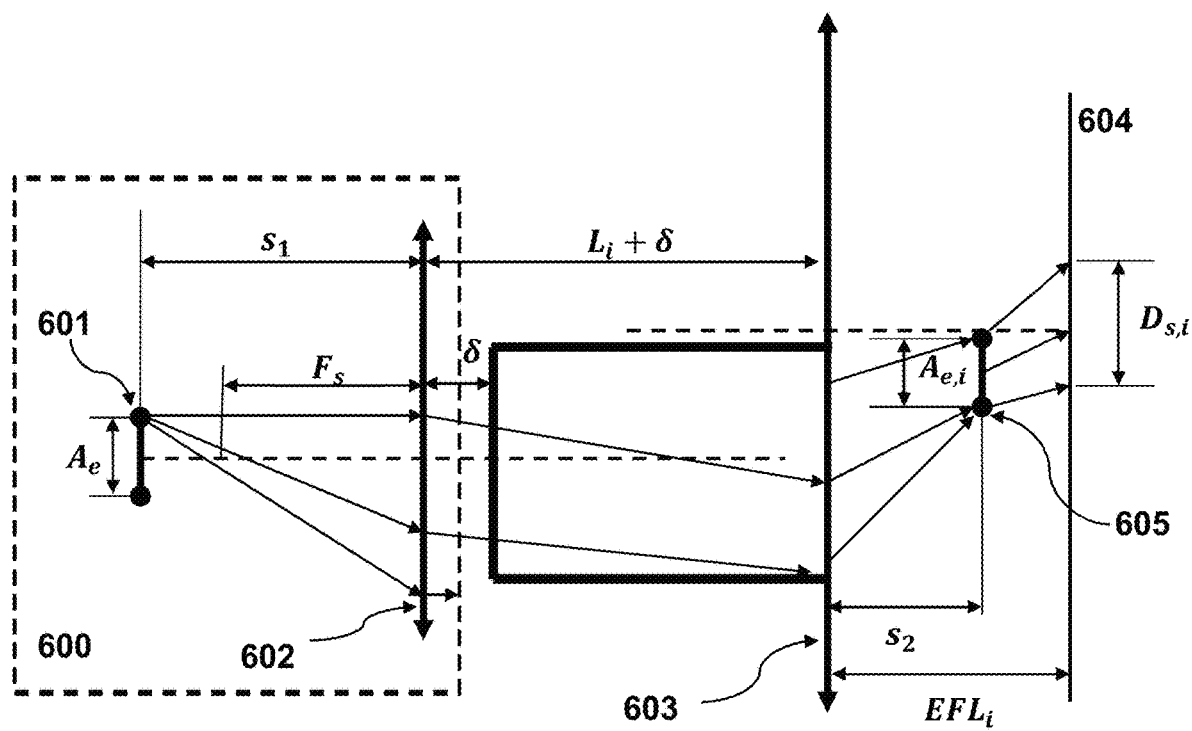
FIG. 6 is a schematic diagram of another embodiment of a RDF illuminator.

Turning to FIG. 6, another embodiment of an elementary RDF illuminator is shown. This embodiment may be seen as one that provides a compromise between effective light collection from the illuminator LEDs and unwanted scattered/reflected light emerging from the BD objective lens RDF port.

In the current embodiment, a lens assembly focal distance $F_s$ is selected and then the lens assembly is placed relative to an emitter of LED 601 based on the lens assembly focal distance. In operation, the elementary illuminator 600 generates a converging beam that is focused by ring mirror/condenser 603 above object plane 604. In order to illuminate required FOV area, this light beam has to diverge until it covers the FOV completely.

To create the required beam, the distance from LED emitter 601 to lens assembly 602 should be selected accordingly. It is assumed that an emitter center of each LED is positioned on the optical axis of its associated lens assembly.

In order to determine a distance between the emitter of each LED with its associated lens assembly, the lens assembly and the ring mirror/condenser are substituted with equivalent thin lens models. The presence of a LED compound material/lens that is formed above LED emitter 601 is assumed when determining the lens assembly equivalent model. The distance from LED emitter to lens assembly $s_{1,max}$ may be calculated as, or selected as, the largest value between the distances $s_{1,i}$ calculated from equation (9). Index i is related to selected BD lens parameters.

$$A_{e,i} + \frac{(T_{i,min} - A_{e,i}) * (EFL_i - s_2)}{s_2} = D_{s,i} \quad (9)$$

where $A_{e,i}$—LED emitter image 605 size, calculated according to equation (10) for every i. For a converging beam this image is formed behind ring lens/condenser above the object plane.

$$A_{e,i} = \frac{A_e \times F_s \times EFL_i}{((L_i + \delta - EFL_i) \times (s_{1,i} - F_s + EFL_i) - F_s \times s_{1,i})} \quad (10)$$

δ—distance from illuminator lens assembly to BD lens RDF port.

$s_2$—distance from ring lens/condenser to LED emitter image, calculated according to equation (11), $$s_2 = \frac{EFL_i \times ((L_i + \delta) \times (s_{1,i} - F_s) - s_{1,i} \times F_s)}{((L_i + \delta - EFL_i) \times (s_{1,i} - F_s) - s_{1,i} \times F_s)} \quad (11)$$

The distance from a light source, or LED, emitter to lens assembly $s_{1,i}$ is selected such that the LED emitter image 605 is formed behind ring mirror/condenser 603 and $s_2>0$. $D_{s,i}$, which represents a required illuminated spot size in the object plane 604 can be calculated, for example, according to equation (6).

Using formulas (10) and (11), parameters $D_{s,i}$ and $\delta$ are substituted into equation (9) and equation (9) is calculated relative to variable $s_{1,i}$ for every BD lens that is being used. Value $s_{i,max}$ is selected as the largest in between calculated values $s_{1,i}$. This value defines the distance from LED emitter to lens assembly.

Values $F_s$ and $s_{1,max}$ may then be used as values for optical design of illuminator 600. At a time of optical design, thin lens model is substituted with real lenses/mirrors prescriptions. Optimal optical prescription for lens assembly 602, having focal distance $F_s$ and its position vs. LED compartment top are calculated. Optimized lens assembly 602 with focal distance $F_s$ and its position vs. LED compartment top define an embodiment of a final layout.

In at least some of the above embodiments, during experimentation, when the LED emitter centers are positioned on the lens assembly optical axis, marginal rays, originated from emitter centers for all LEDs, cross each other in the center of the FOV or were symmetrically defocused around it. As a result, the RDF light intensity profile in the object plane appears like a single peak with its maximum or a high value in the FOV center and roll-off intensity towards periphery.

Figure 7:
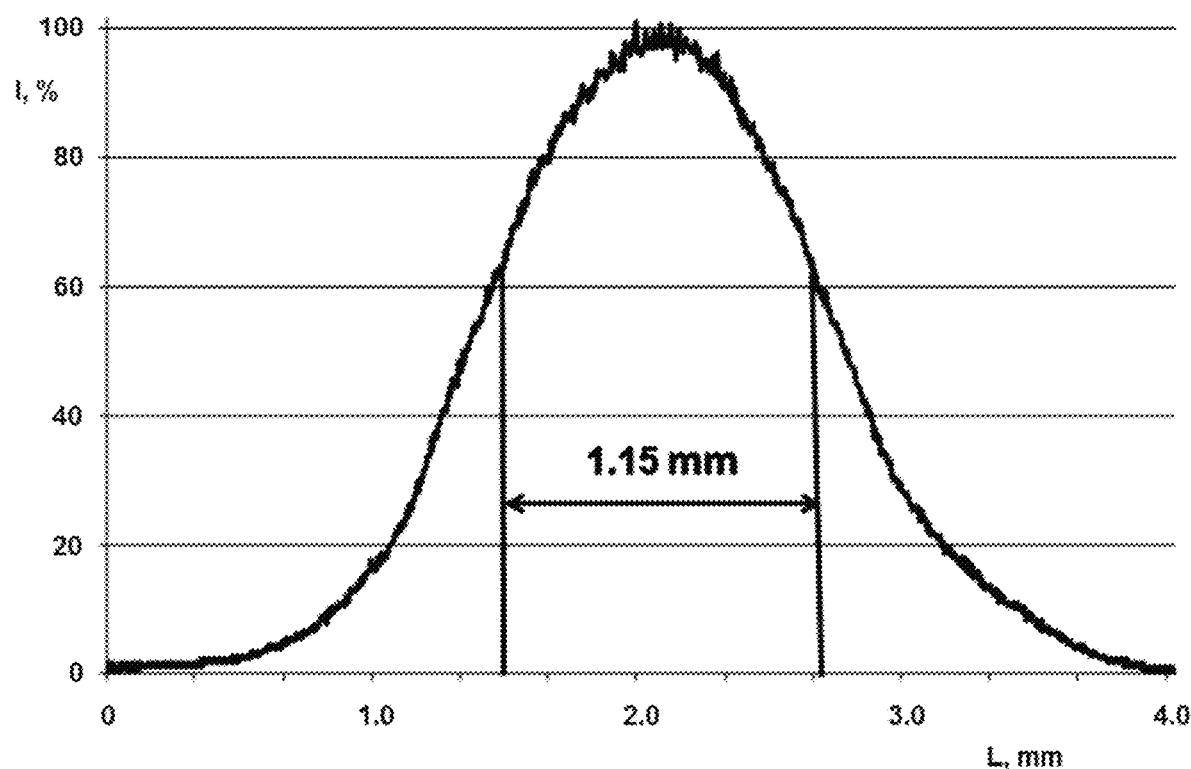
FIG. 7 is a graph of a RDF light intensity profile.

A typical RDF light intensity profile in the object plane is shown at FIG. 7 which was obtained with an RDF illuminator that was built in correspondence with the embodiment of FIG. 6 using BD Plan Apo 20× objective lens. As shown, the RDF intensity exhibits roll-off of the order 35% from FOV center to its periphery. The required illuminated spot diameter was calculated according to equation (6) with $D_s=1.15$ mm, assuming microscope Tube Lens magnification $M_{TL}=1$ and the objective FN=23. Typical roll-off intensity within required size illuminated spots, observed for BD lenses tested with standard microscopes, usually is within 30-50%.

In some cases, the RDF illumination flux non-uniformity may affect the system's ability to provide identical imaging conditions for arbitrary shaped defects/objects of interest, regardless of their position inside microscope FOV and orientation. Any defect/object of interest, being placed at the microscope FOV periphery, will create a lower intensity RDF image than it would have residing in the FOV center. This deficiency can be compensated with RDF image intensity equalization. However, RDF image post-processing equalization may reduce the microscope camera effective Dynamic Range. Therefore, it may be desirable to provide a solution with reduced RDF illumination roll-off intensity in the microscope FOV.

Figure 8A:
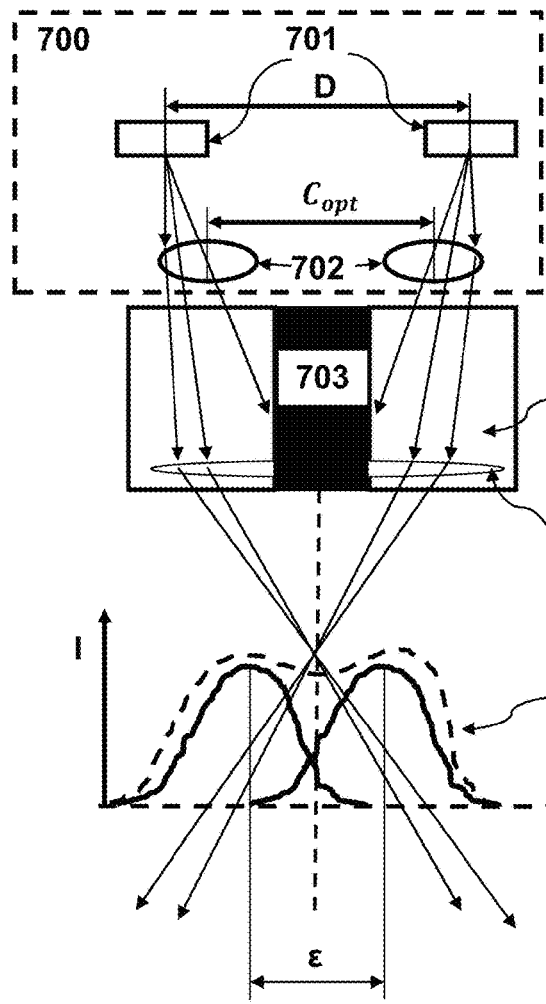
FIG. 8a is a schematic diagram of yet another embodiment of a RDF illuminator.
Figure 8B:
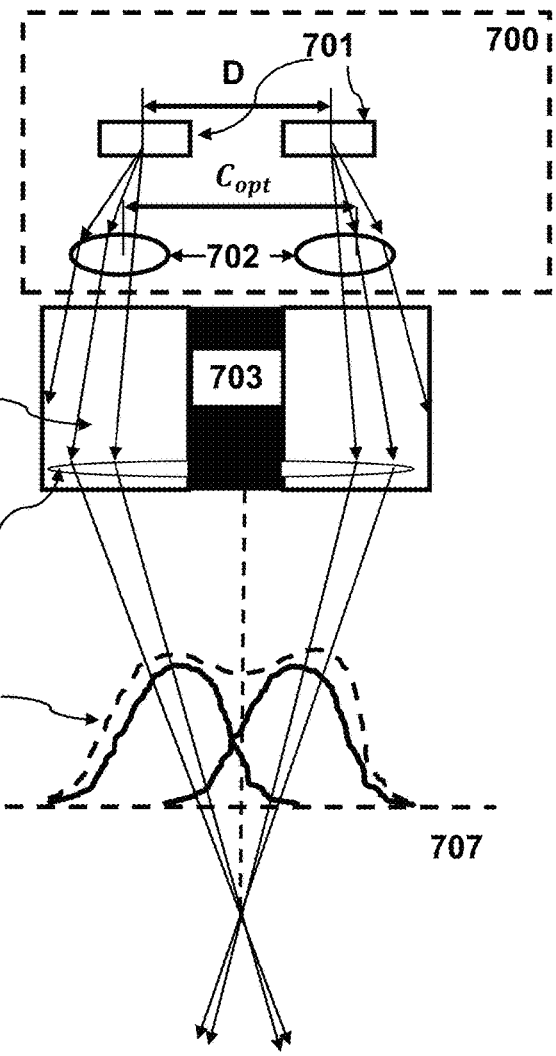
FIG. 8b is a schematic diagram of yet another embodiment of a RDF illuminator.

FIGS. 8a and 8b schematically presents yet another elementary RDF illuminator embodiment to address this issue. This embodiment is designed to provide reduced RDF illumination roll-off intensity in the microscope FOV.

To reduce RDF illumination roll-off intensity in the microscope FOV, the LED emitter center for each LED 701 is not centred with respect to the optical axis of its associated lens assembly in the Y direction or axis. In one embodiment, the LED emitter centers are angled with respect to the optical axis with the same value a for all light source and lens assembly pairs or elementary illuminators. As such, the center of the LED, or light source, emitter, may shift along the tangential YZ plane but does not shift with respect to the XZ sagittal plane. As a result, when the light sources and lens assemblies are assembled into the ring-like shape, the centers of the emitters of the LED will be positioned at circle with diameter $D_{lightsources}$, being equidistantly spaced. At the same time, lens assemblies optical centers will be positioned at circle with diameter $C_{opt}$, being equidistantly spaced.

A relationship between $D_{lightsources}$ and $C_{opt}$ is described by equation (12) where $$D_{lightsource} + 2 \times \sigma = C_{opt} \quad (12)$$

where decentre value $\sigma$ may be positive or negative.

If $\sigma>0$, $D_{lightsources}>C_{opt}$, such as the case with the embodiment of FIG. 8a, light beams generated by the elementary RDF illuminator 700 predominantly converge towards an optical axis of the BD lens 703. Being redirected by ring condenser/illuminator 706, these light beams will create a high or maximum flux above object plane 707 where some of these beams will hit or contact an inner wall of a RDF channel 704.

If $\sigma<0$, $D<C_{opt}$, such as the case with the embodiment of FIG. 8b, beams generated by the elementary RDF illuminator 700 predominantly diverge away from BD lens 703 optical axis. Being redirected by ring condenser/illuminator 706, these light beams create a high or maximum flux below object plane 707 where some of these beams will hit an outer wall of the RDF channel 704.

In both cases, superposition of beams generated by the elementary RDF illuminator in the object plane 707 of BD lens will have a doughnut-like shape 708. This shape will have reduced roll off intensity inside required microscope FOV.

LED emitter centers for embodiments outlined at FIG. 5 and FIG. 6 can be decentred as described, however, it is not recommended to decentre LED emitter centers for the embodiment of FIG. 4 as decentred beams will hit the RDF channel walls and will create certain amount of unwanted scattered/reflected light.

The sign (whether negative or positive) of the decentre (a) depends on RDF port walls scattering/reflectance. If the inner port wall produces less unwanted scattered/reflected light, $\sigma>0$ should be selected. If the outer port wall produces less unwanted scattered/reflected light, $\sigma<0$ should be selected.

Roll-off intensity reduction in this embodiment is achieved at expense of RDF flux reduction in the FOV center. Hence, decentre a value should be selected based on a compromise between the object RDF image uniformity and the object RDF image intensity in FOV center.

Cumulative RDF illumination intensity distribution depends on RDF illumination intensity distribution created by the elementary illuminator and a and shift $\varepsilon$ of the distribution in the object plane. RDF illumination intensity distribution created by elementary illuminator depends on many factors, however, it should be close to the profile shown at FIG. 7.

Shift $\varepsilon$ between distributions in the object plane, based on the embodiment of FIG. 5, can be approximately calculated according to equation (13).

$$\varepsilon = 2 \times \sigma \times \frac{EFL_i}{F_e} \quad (13)$$

where $EFL_i$—BD lens ring condenser/mirror effective focal length in paraxial approximation.

The elementary illuminator lens assembly focal length ($F_e$) may be calculated according to equation (8).

Shift $\varepsilon$ between distributions in the object plane, based on the embodiment of FIG. 6 may be approximately calculated according to equation (14).

$$\varepsilon = 2 \times \sigma \times \frac{A_{e,i} + \frac{(T_{i,min} - A_{e,i}) \cdot (EFL_i - s_2)}{s_2}}{F_s \times A_e} \quad (14)$$

where $A_{e,i}$—LED emitter image size, calculated according to equation (15) for every i.

$$A_{e,i} = \frac{A_e \times F_s \times EFL_i}{((L_i + \delta - EFL_i) \times (s_{1,max} - F_s + EFL_i) - F_s \times s_{1,max})} \quad (15)$$

$s_2$—distance from ring lens/condenser to LED emitter image may be calculated according to equation (16).

$$s_2 = \frac{(EFL_i \times ((L_i + \delta) \times (s_{1,max} - F_s) - s_{1,max} \times F_s)}{((L_i + \delta - EFL_i) \times (s_{1,max} - F_s) - s_{1,max} \times F_s)} \quad (16)$$

$s_{i,max}$—distance from LED emitter to lens assembly, selected according to predetermined characteristics with respect to the embodiment of FIG. 6.

Figure 9:
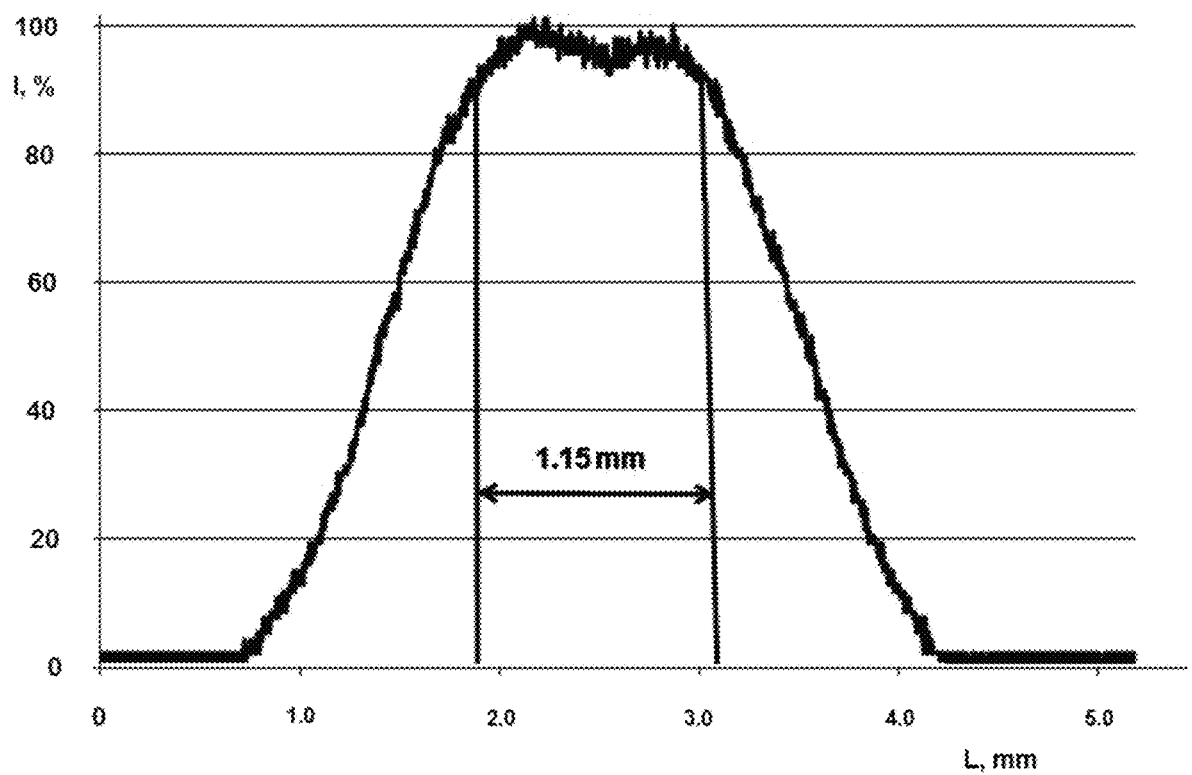
FIG. 9 is a graph of another RDF light intensity profile.

FIG. 9 shows a typical RDF light intensity profile in the object plane for the embodiment of FIG. 8. The plot of FIG. 9 was obtained for an RDF illuminator, built in correspondence with the embodiment of FIG. 8a using a BD Plan Apo 20× lens. As it follows from this plot, the RDF intensity exhibits roll-off of the order of 8% from FOV center to its periphery.

To achieve the roll-off intensity LED emitter centers were decentred vs. lens assemblies optical centers at σ=+0.120 mm. (It was experimentally established, that the BD Plan Apo 20× lens RDF port inner wall produces less unwanted light scattering/reflection than the outer wall). This decentre created a shift ε~0.7 mm between light intensity peaks, induced by elementary illuminators.

It should be noted that creating uniform RDF illumination in the object plane may not fully solve the problem of providing identical imaging conditions for arbitrary shaped defects/objects of interest regardless of their position inside microscope FOV and orientation but may provide improvement over current systems.

BD lens itself and the microscope Tube Lens also can contribute to increasing the RDF image intensity roll-off. In this case, larger decentre values a may be selected. Noticeable RDF illumination dip will be observed in the FOV center in this case. However, the RDF image intensity can be well equalized in the microscope image plane. In this manner, the resulting image may emulate an image that includes an RDF illumination apodizing filter.

It should be noted, that effective RDF image intensity equalization can be optically achieved for BD lenses without diffusers in RDF port. If BD lens RDF port contains a light diffuser, the light diffuser predominantly defines the RDF flux distribution in the object plane. Decentering the LED with respect to its associated lens assembly may not be efficient enough to create or generate required RDF flux profile in FOV.

In order to increase the RDF illuminator flux, superluminescent light emitting diodes or laser diodes may be used as light sources.

In embodiments where laser diodes are used, there may be mounting, control and safety matters to consider. Laser diodes have significantly higher efficiency in comparison with LEDs, reaching 40% efficiency or more. As a result, single mode LDs with emitted power $P_e$~100 mW and/or multi-mode LDs with emitted power $P_e$~200 mW can be used as light sources for a RDF illuminator depending on a desired modularity or application of the imaging system. In one embodiment, the illuminator includes 15 light source and lens assembly pairs and its heat dissipation preferably will not exceed P=10 W.

It is understood that high power ($P_e$~100 mW) single mode LDs and low power multi mode LDs ($P_e$~200 mW) may not be available in SMD packages. They are mainly mounted in D=3.8 mm, 5.6 mm, and 9.0 mm cans and TO-46 packages. In this embodiment, the emitters of the light sources, or the LDs, should be mechanically placed to align with the optical axis of its associated lens assembly. LDs emitters roll angles should be adjusted such to provide high or maximum light injection into BD lens RDF port.

In one embodiment, it may be desirable to use LDs with their anodes and cathodes insulated from their headers. In this embodiment, a plurality of LDs are connected in series to simplify their intensity control, LDs, having the anode or cathode connected to LD header can also be used but their intensity control will be less straightforward. It should be noted that LDs usually are more susceptible to damage due to electro-static discharge (ESD) and application of reverse polarity, than same power LEDs. It is understood that special care should be taken designing computer-controlled driver for these LDs, working in constant current and pulsed current modes.

Using LDs as light sources for RDF illuminators can increase the light flux in the microscope FOV 20-50 times in comparison with one, achieved with LEDs. Radiometric flux of the order of ~1 W/mm² in constant current mode can be reached without illuminator air/water/thermoelectric-cooling or massive heatsinks.

Figure 10:
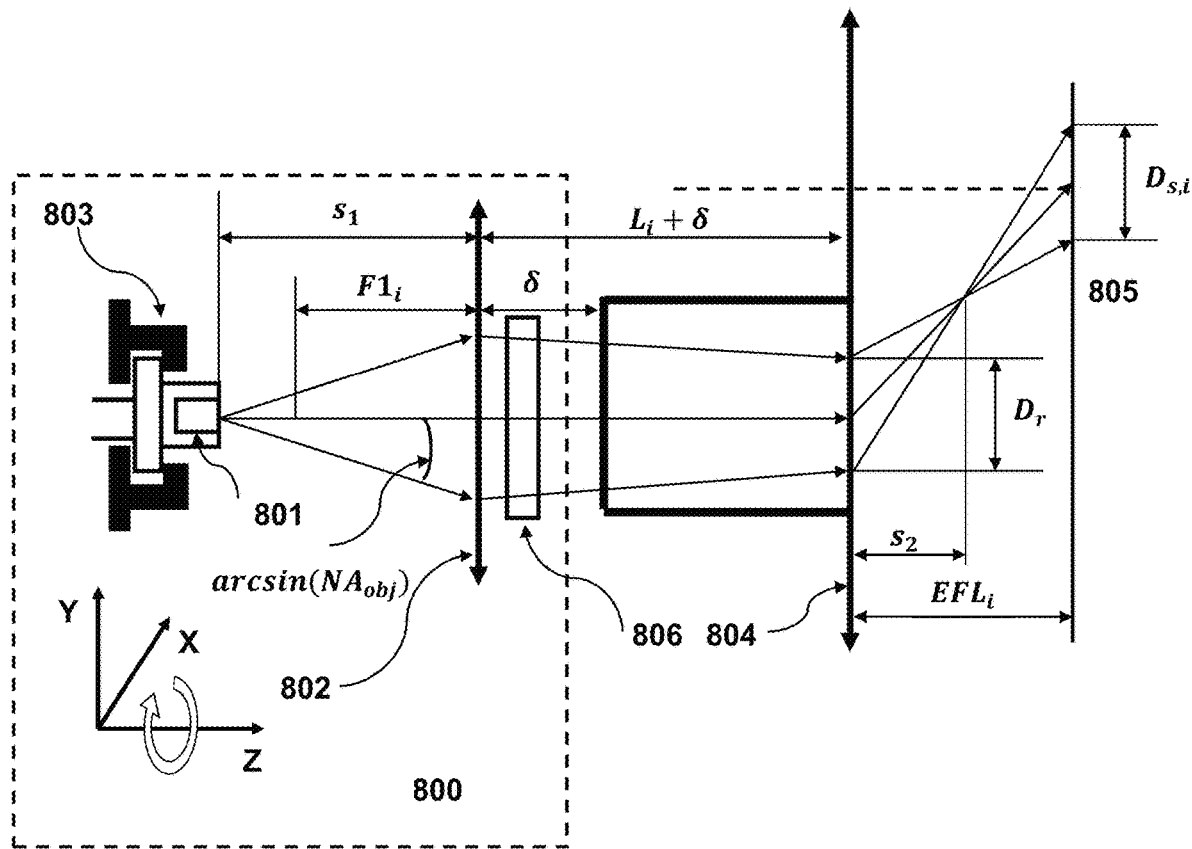
FIG. 10 is a schematic diagram of yet another embodiment of a RDF illuminator.

FIG. 10 schematically presents yet another elementary RDF illuminator embodiment. This embodiment may be seen as a LD based embodiment as the embodiment uses LDs as light sources. One advantage of this embodiment is that it provides high RDF illumination flux in the microscope FOV. As will be understood, while FIG. 10 shows a single light source and lens assembly pair, the system includes multiple light source and lens assembly pairs that may be positioned such as disclosed with respect to FIG. 3 above.

The elementary illuminator 800 includes at least one light source, such as a laser diode, with a LD emitter 801 that is positioned to align with an optical axis 810 of its associated lens assembly 802. It is understood that there are a set of light sources each aligned with associated lens assemblies in a ring-like shape such as disclosed above. In one embodiment, the short sides of the emitter are orthogonal to the radius of the ring of emitters passing the center of the LD emitter. In this manner, a "slow" plane of LD emission will coincide with a tangential plane of the lens assembly 802. LD emission divergence angle $\Theta_\parallel$ is smaller than the one $\Theta_\perp$ observed in orthogonal "fast" plane. Placing the LD "slow" plane into the lens assembly tangential plane simplifies effective LD light collection.

The elementary illuminator 800 further includes a light source holder 803 that includes an apparatus for controlling the light source, or LD, to adjust the light source with respect to the X and Y axes and its roll angle. In this embodiment, the illuminator further includes a ring mirror/condenser 804 and a retardation plate 806, although in some embodiments there may be no retardation plate. In use, the elementary illuminator 800 creates a converging beam of light.

With respect to a light collection angle and determining the lens assembly focal distance, the lens assembly 802 and the ring mirror/condenser 804 may be substituted with equivalent thin lens models for calculation purposes. If there is a retardation plate 806, this is taken in account in determining the lens assembly equivalent model.

Initially, the lens assembly object plane numerical aperture $NA_{obj}$ is selected. If $NA_{obj} > \sin(\Theta_\parallel)$, most of the light diverging from LD emitter in the "slow" plane will be collected by lens assembly such that $NA_{obj}$ can be set $NA_{obj} \leq \sin(\Theta_\parallel)$. In this example, the RDF light intensity roll-off in BD lens object plane 805 will be smaller at the expense of a reduced elementary illuminator light efficiency.

As soon as lens assembly object plane numerical aperture $NA_{obj}$ is set, it defines the distance $s_1$ between emitter of the light source 801 and the lens assembly 802 according to equation (17).

$$s_1 = \frac{T_{i,min}}{2 \times tg(\arcsin(NA_{obj}))} \quad (17)$$

The lens assembly focal distance $F1_{max}$ is selected as the largest value between focal distances $F1_i$ calculated from equation (18). Index i is related to selected BD lens parameters.

$$\frac{EFL_i \times D_r}{s_2} - D_r = D_{s,i} \quad (18)$$

where $s_2$—distance from ring lens/condenser to LD emitter image, calculated according to equation (19).

$$s_2 = \frac{EFL_i \times \left[(L_i + \delta) - \frac{s_1 \times F1_i}{(s_1 - F1_i)}\right]}{\left[(L_i + \delta) - EFL_i - \frac{s_1 \times F1_i}{(s_1 - F1_i)}\right]} \quad (19)$$

$D_r$—LD light spot size in tangential plane on ring lens/condenser, calculated, according to equation (20).

$$D_r = T_{i,min} - 2 \times (L_i + \delta) \times tg\left(\frac{\arcsin(NA_{obj}) \times (s_1 - F1_i)}{F1_i}\right) \quad (20)$$

Parameter δ (derived from equations 19 and 20) is then substituted into equation (18) and equation (18) solved relative to variable $F1_i$ for every BD objective lens that is being used. Value $F1_{i,max}$ is selected as the largest of the calculated values $F1_i$. This value defines the lens assembly focal distance.

Apart from LEDs, light from many LDs is predominantly linearly polarized. As soon as LD emitter orientation with its "slow" axis coincides with the elementary RDF illuminator tangential plane,—the specimen in BD lens object plane will be illuminated with predominantly −p polarized light. In other words, electric field vector $\vec{E}$ in incident RDF light will predominantly oscillate in a plane of incidence.

As it follows from light diffraction theory and experiments, some defects/objects of interest, residing on substrates, produce stronger scattering towards microscope imaging system, being illuminated with −s polarized light, than with −p polarized light. Therefore it is desirable to illuminate these objects with −s polarized light.

There are two ways to change the emitted light polarization from predominantly −p polarized to predominantly −s polarized: 1) rotate LD emitter 90° around Z axis (roll angle change) (which may reduce the illuminator light throughput); or 2) install a retardation plate (half-wave plate (HWP)) 806 after lens assembly 802 whereby the HWP will rotate incoming light plane of polarization 90°, preserving preferred LD emitter orientation.

Values $F1_{i,max}$ and $s_1$ are used as starting values for the optical design of illuminator 800. At a time of optical design, thin lens model is substituted with real lenses/mirrors prescriptions. Optimal optical prescription for lens assembly 802, having focal distance $F_{opt}$ and its position vs. LD can top are calculated.

Optimized lens assembly 802 with focal distance $F_{sopt}$ and its position vs. LD can top define a layout of this embodiment.

In operation, RDF illuminators may produce a certain amount of unwanted scattered/reflected light. This light increases the RDF image background. An amount of unwanted light raises significantly when diffusive matter is used inside BD lenses RDF ports.

Figure 11:
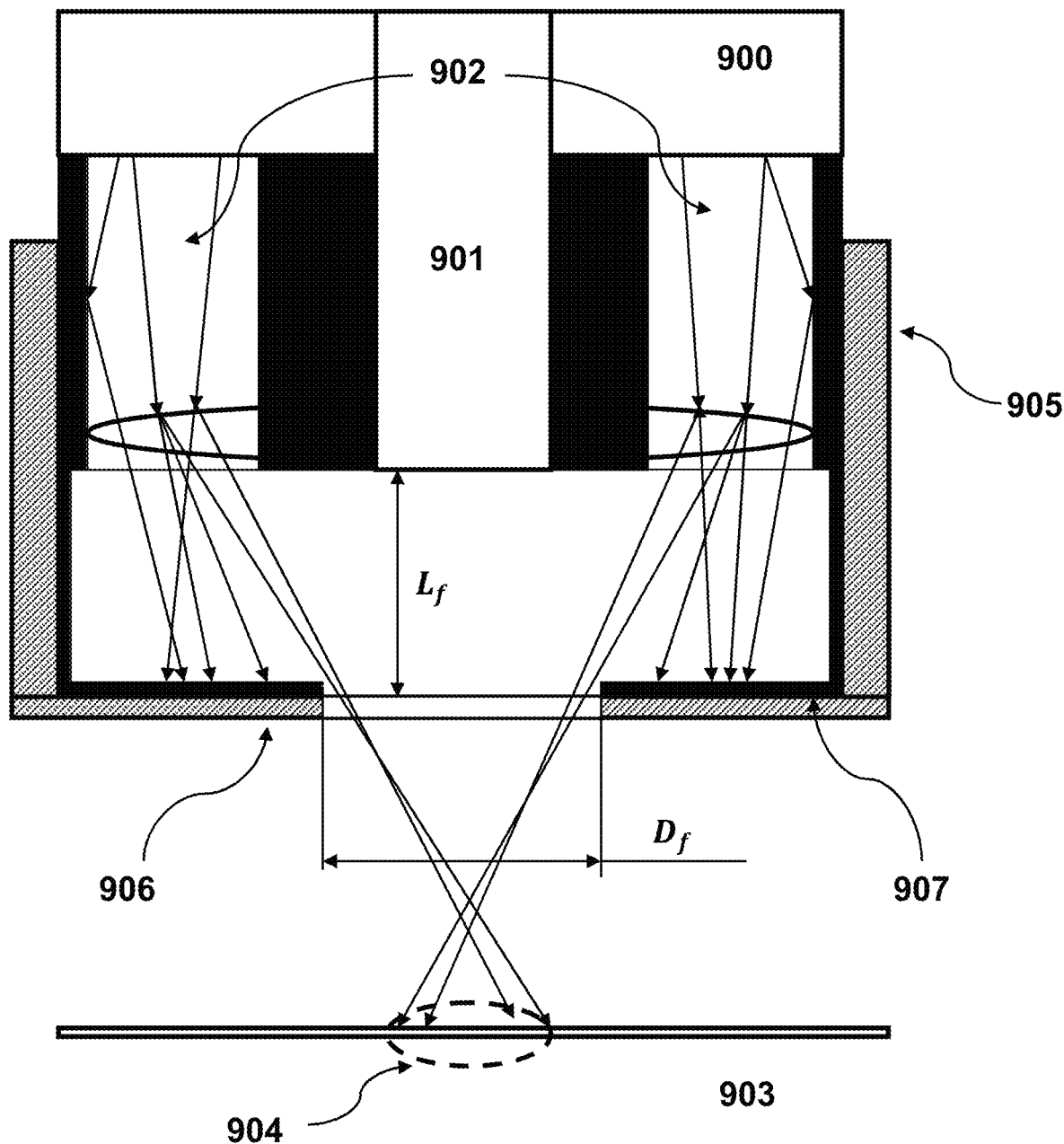
FIG. 11 is a schematic diagram of another embodiment of a RDF illuminator.

FIG. 11 schematically presents yet another RDF illuminator embodiment. This embodiment may be seen as one that provides unwanted reflected/scattered light suppression at the expense of BD lens working distance reduction.

A plurality of elementary RDF illuminators, built in accordance with embodiments shown at FIGS. 4 to 6, 8 and 10 are assembled together, creating ring-like RDF illuminator 900 described at FIG. 3. The illuminator 900 injects light into an RDF port 902 of BD lens 901. Light on RDF port 902 propagates towards lens object pane 903. Ideally, all light beams originating at RDF port exit, should come to the microscope FOV 904 in the object plane 903, however, a certain amount of light typically bypasses the microscope FOV. A portion of this light may be redirected to the microscope camera/observer eye. This light will increase the RDF image unwanted background, limiting microscope capability for small defects/objects of interest inspections and observations.

Therefore unwanted light reduction may be provided to improve the microscope RDF channel sensitivity. Elementary illuminators described at FIGS. 4 and 10 are designed such that light beams from illuminator 900 do not touch RDF port walls, therefore the amount of unwanted light is reduced. However, as soon as BD lenses with diffusive matters inside RDF ports are used, significant unwanted light appearance may occur.

Light beams, reaching microscope FOV and unwanted light beams are mixed together on RDF port exit. However, they become more and more spatially separated propagating towards object plane 903. To reduce unwanted light intensity, reduce RDF image background and increase microscope RDF channel sensitivity, an external spatial filter 905 may be installed or integrated. In one embodiment, the filter is mounted onto a cylindrical part of the BD objective lens body and secured to it in a pre-defined position. The filter blocks unwanted light at certain distance below BD lens, allowing light coming towards microscope FOV to pass.

In one embodiment, the filter 905 has a circular aperture 906 with diameter $D_f$ at its bottom. The filter inner walls may be covered with light absorbing matter 907. The aperture diameter $D_f$ and its position $L_f$ vs. BD lens RDF port exit are defined on the basis of compromise between RDF image background reduction and BD lens working distance WD reduction wherein these two parameters are defined individually for every BD lens used for the application.

If BD lens working distance reduction is allowed, the spatial filters may be used with any illuminator 900 built on the basis of any elementary illuminators, shown at FIGS. 4 to 6, 8 and 10.

Spatial filter built in accordance with embodiment shown at FIG. 11, was mounted on a BD Plan Apo 10× lens that has a ring condenser with anisotropic diffusive surface, installed inside RDF port. This lens has nominal working distance WD=34 mm.

The spatial filter was installed such that its circular aperture was positioned at a distance $L_f$=9 mm below BD lens port exit. As a result, the assembly working distance was WD-25 mm. RDF illuminator built in accordance with embodiments shown at FIGS. 3 and 6 was used. The spatial filter installation reduced the RDF image background ~8 times for described embodiments' realization.

RDF illuminators, built in correspondence with embodiments, described above, should be properly integrated into optical microscopes. It is required that the distance between RDF illuminator and BD lenses be constant for all lenses used.

Figure 12:
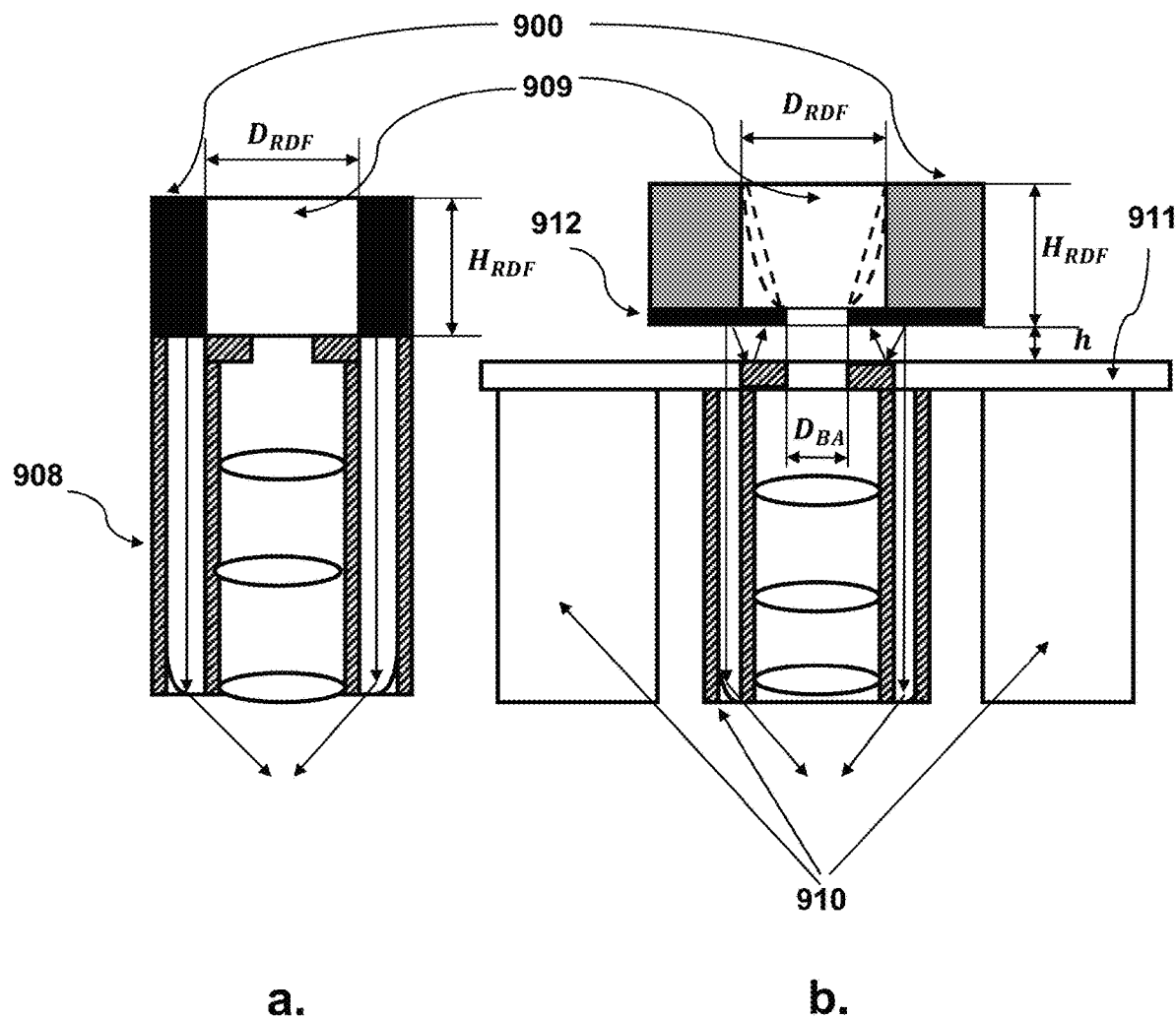
FIG. 12 is a schematic diagram of yet a further embodiment of a RDF illuminator.

If single BD lens 908 is used such as shown in FIG. 12a, there should not be any gap between RDF illuminator 900 bottom and the lens top. Opening 909 collects or receives sufficient for light, collected by the BD lens, to pass towards microscope Tube Lens unobstructed.

If the illuminator has height $H_{RDF}$, opening 909 diameter it should be at least $D_{RDF}$. Value $D_{RDF}$ is selected as the largest in between values $D_{RDF,i}$ calculated according to equation (21).

$$D_{RDF,i} = \frac{D_{s,i} \times H_{RDF}}{FL_i} + D_{BA} \qquad (21)$$

where $D_{s,i}$—required illuminated FOV diameter for lens i. It may be selected or calculated, for example, according to equation (6);
FL$_1$—BD lens effective focal length;
$D_{BA}$—BD lens back aperture diameter.

If a plurality of BD lenses 910 is used such as shown in FIG. 12b, mechanical design may be required to reduce or eliminate the gap between RDF illuminator bottom and BD lens top. In most cases, gap of the order of h~0.5 mm is left to simplify the lens changer 911 design.

In this case, it is preferred that the RDF illuminator body would have a light trap. The light trap will reduce the risk that a portion of the RDF illumination will penetrate the microscope 200 camera/observer eye (the portion of the RDF illumination that may be reflected from the BD lens top surface towards microscope camera/observer eye).

The light trap is formed with circular aperture plate, having clear aperture diameter $D_{BA}$ at RDF illuminator bottom and BD lens back aperture. The RDF illuminator bottom is covered with light absorbing matter 913. If some unwanted light emerges from RDF illuminator into gap between illuminator and BD lens, the light will experience multiple reflections between two light absorbing surfaces. In this way, unwanted light will be quickly absorbed.

The RDF illuminator in this embodiment still has to have opening $D_{RDF}$ at its top. The opening walls may have vertical, conical or sub-linear shape. Vertical walls are preferred as the easiest for manufacturing.

Modern microscopes usually provide several microscopic modalities to their users. In many cases microscopes with RDF modality also have Reflected Bright Field (RBF) modality available. To provide optimal RBF illumination, 50R/50T (reflectance R=50%, transmittance T=50%) beam-splitters are installed into the microscope infinity path. The beam-splitters are optimal for RBF channel, but not for an RDF channel. These beam-splitters reflect sideways half of light, collected by BD lenses, working in RDF mode (to reduce or eliminate these losses, 50R/50T beam-splitter is mechanically removed from Vendor B microscope infinity path, as soon as microscope is switched into RDF mode.)

If broadband illumination is required as for RBF so for RDF modalities, it is proposed to use RBF light coupling beam-splitter with elevated transmittance (for example 40R/60T, 30R/70T, 20R/80T etc.). While the beam-splitter may not be optimal for RBF channel, however, its reduced light inefficiency for RBF channel can be compensated with higher intensity RBF light sources. At the same time, RDF channel efficiency will be improved.

Figure 13:
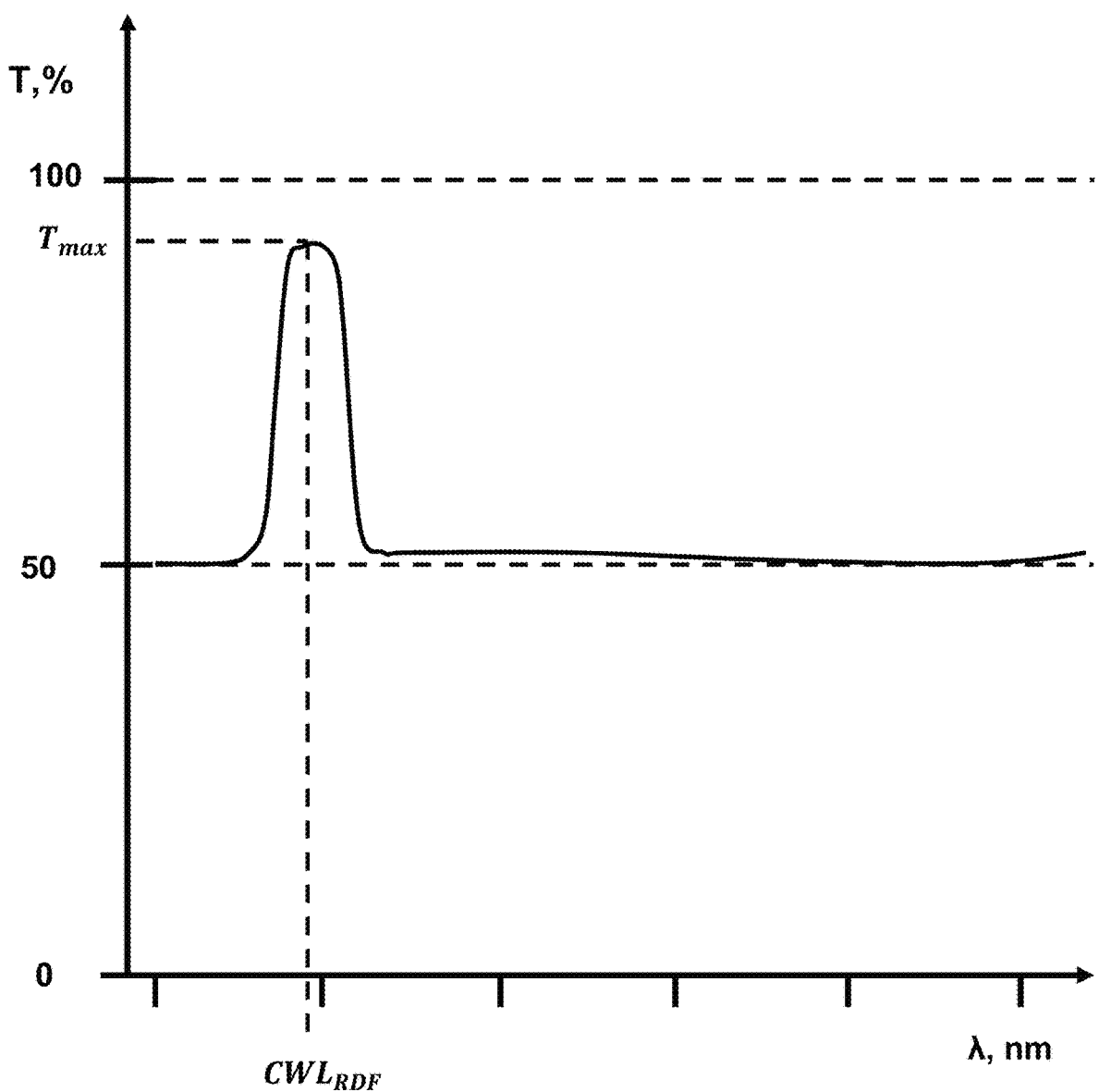
FIG. 13 is a schematic diagram of a filter transmittance plot.

In some embodiments, broadband illumination is required for RBF modality only whereby the RDF illuminator can use monochromatic light. In this case a broadband beam-splitter may be substituted with a RBF light coupling filter, having elevated light transmittance in spectral range around RDF illuminator central wavelength (CWL$_{RDF}$) and 50R/50T beamsplitting ratio for the rest of spectrum. The filter transmittance in spectral range around RDF illuminator CWL$_{RDF}$ may be as high as $T_{max}$=100%. Proposed filter transmittance plot is shown at FIG. 13. Abscissa axis presents light emission wavelength λ. In one embodiment, the filters may be manufactured with rugate technology. In other words, the system may include beamsplitters and/or filters for improving RDF channel light throughput.

In the preceding description, for purposes of explanation, numerous details are set forth in order to provide a thorough understanding of the embodiments. However, it will be apparent to one skilled in the art that these specific details may not be required. In other instances, well-known structures are shown in block diagram form in order not to obscure the understanding.

The above-described embodiments of the disclosure are intended to be examples of the present disclosure and alterations and modifications may be effected thereto, by those of skill in the art, without departing from the scope of the disclosure.

The invention claimed is:

1. An apparatus for reflective dark field illumination in an imaging system comprising:
   a set of elementary illuminators, each of the set of elementary illuminators including a light source, a lens assembly, a retardation plate and an illuminator aperture; and
   a bright field/dark field (BD) lens;
   wherein the set of elementary illuminators are positioned in a ring-like shape to direct light towards a port of the BD lens; and
   wherein a lens assembly focal distance and a distance between a light source and a lens assembly are determined based on an application of the imaging system.

2. The apparatus of claim 1 wherein each of the set of elementary illuminators further comprises a light source aperture located between the light source and the lens assembly for directing light from the light source towards the lens assembly.

3. The apparatus of claim 1 further comprising:
a ring mirror or ring condenser located within the BD lens to directed received light towards an optical plane.

4. The apparatus of claim 1 further comprising a spatial filter mounted to the BD lens.

5. The apparatus of claim 1 wherein the distance between a light source and a lens assembly is calculated based on largest comparative lens assembly focal distance, calculated for every BD objective lens, attached to the imaging system.

6. The apparatus of claim 1 wherein lens assembly focal distance and a distance between a light source and a lens assembly are selected using a thin lens approximation.

7. The apparatus of claim 1 wherein the lens assembly comprises a single, multiple or compound lens.

8. The apparatus of claim 1 wherein the light source is a light emitting diode (LED), a superluminescent diode (SLEDs) or a laser diode (LD).

9. The apparatus of claim 1 wherein the light source is aligned with an optical axis of the lens assembly in each of the set of elementary illuminators.

10. The apparatus of claim 1 wherein the light source is shifted with respect to an optical axis of the lens assembly in each of the set of elementary illuminators.

11. The apparatus of claim 1 wherein a number of elementary illuminators in the set of elementary illuminators is a multiple of three.

12. The apparatus of claim 1 further comprising a set of beamsplitters for improving reflective dark field (RDF) channel light throughput.

13. The apparatus of claim 1 further comprising a set of filters for improving reflective dark field (RDF) channel light throughput.

14. A method of generating reflective dark field illumination in a microscope comprising:
placing a set of elementary illuminators in a ring-like shape, each of the set of elementary illuminators including a light source, a lens assembly, a retardation plate and an illuminator aperture; and
directing light from each of the set of elementary illuminators at a reflective dark field (RDF) port of a bright field/dark field (BD) objective lens;
wherein a distance between the light source and the lens assembly in each of the set of element illuminators is determined based on an application of the microscope; and
wherein a focal distance of the lens assembly within each of the set of elementary illuminators is determined based on the application of the microscope.

15. The method of claim 14 further comprising:
spatially filtering the light from each of the set of elementary illuminators.

* * * * *